United States Patent
Watson, III et al.

(10) Patent No.: US 11,657,348 B2
(45) Date of Patent: May 23, 2023

(54) SYSTEM FOR DYNAMIC EXCEPTION PRIORITIZATION

(71) Applicant: Bank of America Corporation, Charlotte, NC (US)

(72) Inventors: Verion S. Watson, III, Charlotte, NC (US); Eric T. Dryer, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 291 days.

(21) Appl. No.: 16/907,547

(22) Filed: Jun. 22, 2020

(65) Prior Publication Data

US 2021/0398051 A1    Dec. 23, 2021

(51) Int. Cl.
| | |
|---|---|
| *G06Q 10/06* | (2023.01) |
| *G06F 19/20* | (2011.01) |
| *G06Q 10/0631* | (2023.01) |
| *G06Q 20/20* | (2012.01) |
| *G06Q 30/018* | (2023.01) |
| *G07F 19/00* | (2006.01) |
| *G06Q 20/10* | (2012.01) |
| *G06Q 10/107* | (2023.01) |
| *G06Q 40/02* | (2023.01) |

(52) U.S. Cl.
CPC ............. *G06Q 10/06316* (2013.01); *G06Q 10/063114* (2013.01); *G06Q 10/107* (2013.01); *G06Q 20/1085* (2013.01); *G06Q 20/202* (2013.01); *G06Q 20/203* (2013.01); *G06Q 30/0185* (2013.01); *G06Q 40/02* (2013.01); *G07F 19/206* (2013.01); *G07F 19/211* (2013.01)

(58) Field of Classification Search
CPC ................................ G06Q 10/06; G06F 19/20
USPC ........................................................ 705/7.26
See application file for complete search history.

(56) References Cited

U.S. PATENT DOCUMENTS

| | | | |
|---|---|---|---|
| 5,253,167 A | 10/1993 | Yoshida et al. | |
| 6,021,400 A * | 2/2000 | Gallacher | G07F 19/20 |
| | | | 705/42 |
| 6,334,117 B1 | 12/2001 | Covert et al. | |
| 7,080,036 B1 | 7/2006 | Drummond et al. | |
| 7,093,750 B1 | 8/2006 | Block et al. | |

(Continued)

OTHER PUBLICATIONS

U.S. Appl. No. 16/907,518, filed Jun. 22, 2020, Hunt et al.
U.S. Appl. No. 16/907,584, filed Jun. 22, 2020, Hunt et al.

*Primary Examiner* — Nga B Nguyen

(57) ABSTRACT

A device includes a memory configured to store prioritization thresholds. The prioritization thresholds include one or both of threshold values and threshold ranges associated with an age and an amount of exceptions. A processor of the device receives exceptions associated with operation of at least a portion of the plurality of ATMs. For each exception of the plurality of exceptions, the processor determines, based on a comparison of an age property of the exception to an age threshold of the prioritization thresholds, an age score for the exception. The processor determines, based on a comparison of an amount property of the exception to an amount threshold of the prioritization thresholds, an amount score for the exception. Based on the age and amount scores, a prioritization score is determined for the exception which corresponds to a measure of an order in which action should be taken to resolve the exception.

20 Claims, 9 Drawing Sheets

(56) References Cited

U.S. PATENT DOCUMENTS

| | | |
|---|---|---|
| 7,219,083 B2 | 5/2007 | Bellucci |
| 7,230,223 B2 | 6/2007 | Jespersen et al. |
| 7,458,507 B2 | 12/2008 | Fillinger et al. |
| 7,606,767 B1 | 10/2009 | Couper et al. |
| 7,644,040 B2 | 1/2010 | Drummond et al. |
| 7,870,498 B2 | 1/2011 | Drummond et al. |
| 7,926,712 B2 | 4/2011 | Schlabach et al. |
| 7,959,072 B1 | 6/2011 | Jenkins et al. |
| 7,992,777 B1 | 8/2011 | Block et al. |
| 8,078,518 B2 | 12/2011 | Goertz et al. |
| 8,123,120 B2 | 2/2012 | Couper et al. |
| 8,204,829 B2 | 6/2012 | Alvarez et al. |
| 8,231,049 B2 | 7/2012 | Agrawal |
| 8,496,167 B2 | 7/2013 | Rolland et al. |
| 8,630,950 B2 | 1/2014 | Saegert et al. |
| 9,317,745 B2 | 4/2016 | Smith et al. |
| 10,290,052 B1 | 5/2019 | Quesenberry et al. |
| 10,353,689 B2 | 7/2019 | Mishra et al. |
| 10,395,199 B1 | 8/2019 | Gibson et al. |
| 2002/0082994 A1 | 6/2002 | Herziger |
| 2004/0215566 A1 | 10/2004 | Meurer |
| 2007/0131757 A1 | 6/2007 | Hamilton et al. |
| 2010/0042541 A1 | 2/2010 | Kang et al. |
| 2010/0145857 A1* | 6/2010 | Davila ................ G07F 19/211 705/44 |
| 2012/0012652 A1 | 1/2012 | Couper et al. |
| 2012/0168498 A1 | 7/2012 | Couper et al. |
| 2015/0363755 A1* | 12/2015 | Walden ................ G07F 19/209 705/43 |
| 2015/0379489 A1 | 12/2015 | Gopalakrishnan et al. |
| 2017/0221295 A1 | 8/2017 | Pont et al. |
| 2019/0259094 A1 | 8/2019 | Quesenberry et al. |
| 2019/0370783 A1 | 12/2019 | Aabye et al. |
| 2020/0097933 A1 | 3/2020 | Walden et al. |

\* cited by examiner

⌐ 220a,b

To: <Servicer DGs> — 252
From: <ATM Exceptions> — 254              — 256
Subject Line: ATM Exceptions Issue Notification for <Servicer / Branch> - <ATM ID> - <Servicer Case #>
                       ⌐ 258            ⌐ 260

Issue Details:

exception of Missing Residual Cash was Identified.
                    ⌐ 262         ⌐ 258                        ⌐ 264
On <Settlement Date>, ATM <ATM ID> was decreased by $<Decrease Amount>.
However, the vault has not reported residuals on the vault sheet.

Action Required for Resolution:

Confirm if these residuals have been returned to your vault. If yes, report them on today's Vendor Vault Sheet

Do not reply to this email. Follow the instructions below.

Ensure to obtain the Residual Reporting Date and Residual Reported Amount requested detail prior to leveraging the link below to respond with the resolution by <Deadline>

<Webform link> — 268                                             ⌐ 266

Thank you,
ATM Exceptions

Encryption Resolution Portal

Residual Reporting Date:      [  /  /  ] — 272

Residual Reporting Amount:   [ $       ] — 274

Vault Return Confirmed?      YES ○    NO ○ — 276

[SUBMIT REPORT] — 278           Contact Help

*FIG. 2C*

SYSTEM FOR DYNAMIC EXCEPTION PRIORITIZATION

TECHNICAL FIELD

The present disclosure relates generally to automated teller machines. More particularly, in certain embodiments, the present disclosure is related to a system for dynamic exception prioritization.

BACKGROUND

Automated teller machines (ATMs) are devices that allow certain financial transactions to be performed without interacting with a human (e.g., a bank teller or other staff at a financial institution). ATMs may be used for a range of services such as cash withdrawals, cash deposits, fund transfers, and the like. ATMs may be serviced by service providers, such that an appropriate amount of cash is available to users. For instance, a service provider may add and/or remove money stored in an ATM.

SUMMARY

In an embodiment, a device for resolving exceptions associated with automated teller machines (ATMs) includes a memory and a processor. The memory is configured to store contact information for associates tasked with resolving the exceptions and a set of correspondence templates for requesting predefined types of information from one or more service providers. The processor is coupled to the memory. The processor determines a first exception has occurred associated with a first ATM. The first exception corresponds to a discrepancy between transaction information from the first ATM and service information from a service provider tasked with servicing the first ATM. An exception profile is determined for the first exception. The exception profile includes an indicator of the determined first exception, an identifier of a first ATM associated with the first exception, a first service provider tasked with servicing the first ATM, and a first associate tasked with resolving the first exception. The exception profile is provided for viewing in a user interface accessible to the first associate. The processor receives, from the user interface, a request for information associated with resolving the first exception. Using the correspondence templates, correspondence is generated which includes the request for the information associated with resolving the first exception. The correspondence is addressed to the first service provider. The correspondence is provided to the first service provider. A response is received from the first service provider. At least a portion of the information included in the received response is provided for viewing in the user interface accessible to the first associate. A resolution status for the first exception is received from the user interface. The resolution status is determined based at least in part on the provided portion of the information included in the received response.

In another embodiment, a system includes a plurality of automated teller machines (ATMs). Each ATM is associated with a service provider tasked with servicing the ATM. A device includes a memory configured to store prioritization thresholds. The prioritization thresholds include one or both of threshold values and threshold ranges associated with an age and an amount of ATM exceptions. Each ATM exception includes a discrepancy between transaction information from an ATM of the plurality of ATMs and service information from the service provider tasked with servicing the ATM. The device includes a processor coupled to the memory. The processor receives ATM exceptions associated with operation of at least a portion of the plurality of ATMs. For each ATM exception of the plurality of ATM exceptions, the processor determines, based on a comparison of an age property of the ATM exception to an age threshold of the prioritization thresholds, an age score for the ATM exception. The age property includes an amount of time that has elapsed since an event associated with the ATM exception. The processor determines, based on a comparison of an amount property of the ATM exception to an amount threshold of the prioritization thresholds, an amount score for the ATM exception. The amount property includes an amount of money associated with the ATM exception. The processor determines, based on the age score and the amount score, a prioritization score for the ATM exception. The prioritization score corresponds to a measure of an order in which action should be taken to resolve the ATM exception. An exception queue is generated which includes each of the received ATM exceptions ordered according to the prioritization score determined for each ATM exception.

In yet another embodiment, a system includes a template database configured to store, for each of a plurality of predefined root causes, a corresponding correspondence template and response form template. Each root cause corresponds to a cause of an exception associated with an ATM. An automatic reconciliation tool determines a first exception has occurred associated with a first ATM. The first exception corresponds to a discrepancy between transaction information from the first ATM and service information from a service provider tasked with servicing the first ATM. A first set of exception parameters are determined associated with the first exception. The first set of exception parameters include one or more of an identity of the service provider tasked with servicing the first ATM, an identifier of the first ATM, and an amount associated with the first exception. A party is determined at the first service provider with which to correspond in or order to resolve the first exception. Based on the first set of exception parameters, a first root cause of the first exception is determined. Using the template database, a first correspondence template and a first response form template are identified for the determined first root cause. Using the first correspondence template, a first correspondence is determined which includes a description of the first exception, instructions for one or more actions to take in response to receiving the first correspondence, and a link configured to provide access to a first response form. Using the first response template, the first response form is generated which includes one or more fields for providing at least one response parameter associated with the request for action. The first correspondence is provided to the determined party.

When a service provider services an ATM, a certain amount of cash may be added or removed from the ATM. The amount of cash added or removed should be in agreement with the record of transactions recorded at the ATM. For instance, if a service provider removes $20,000 from an ATM and reports that the ATM is storing 50,000, then the record of withdrawals and deposits at the ATM should correspond to a total cash amount of $70,000 at the time the service provider serviced the ATM. Any discrepancy between the ATM's records and the reporting of the service provider must be resolved. Such discrepancies are referred to in this disclosure as ATM exceptions. Previous systems lack tools for efficiently detecting and resolving such exceptions. Instead, previous technology involves repeated ad hoc communication between ATM analysts and service providers to attempt to resolve ATM exceptions. Certain ATM exceptions may have statutory time limits, such that beyond these time limits (e.g., of about a month or so), it may be impossible to resolve an ATM exception and either recover any funds lost or provide lost funds to clients.

Certain embodiments of this disclosure provide unique solutions to technical problems of previous technology used for detecting and resolving ATM exceptions. For example, the disclosed systems provide several technical advantages which include 1) the reliable detection of ATM exceptions and routing of these exceptions and associated information to appropriate analysts for resolution via an easy-to-use user interface; 2) an exception prioritization tool which facilitates the more efficient deployment of resources such that high-priority exceptions are proactively reconciled; and 3) more efficient and reliable reconciliation of certain types of ATM exceptions via an automated web-form tool. As such, this disclosure may improve the function of computer systems used to monitor a number of deployed ATMs and facilitate the resolution of ATM exceptions that arise. The systems described in this disclosure may provide an improved audit trail of correspondence and other resolution actions that are taken. The system described in this disclosure may decrease computing resources used for maintaining ATM records and taking actions to resolve ATM exceptions. The systems may also or alternatively prevent high priority exceptions from being missed when there is a high back log of exceptions to resolve.

In some embodiments, the systems and methods described in this disclosure may particularly be integrated into a practical application for providing automated reconciliation of ATM exceptions by automatically providing a user-friendly webform to service providers to request relevant information to resolve the exception (see, e.g., FIGS. 2A-C and 3 and the corresponding description below). In some embodiments, the systems and methods described in this disclosure may particularly be integrated into a practical application for prioritizing detected ATM exceptions such that, in the absence of sufficient resources to resolve every exception, the exceptions associated with the greatest amount of funds and/or that are most likely to reach statutory time limits are handled first (see, e.g., FIGS. 4-5 and the corresponding description below). In some embodiments, the systems and methods described in this disclosure may particularly be integrated into a practical application for matching exceptions to appropriate associates and correspondence types to efficiently resolve ATM exceptions (see, e.g., FIGS. 6-7 and the corresponding description below).

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2B is a diagram illustrating an example correspondence template used by the system of FIG. 1;

FIG. 2C is a diagram illustrating an example webform generated by the automatic reconciliation tool of FIG. 2A;

DETAILED DESCRIPTION

Figure 1:
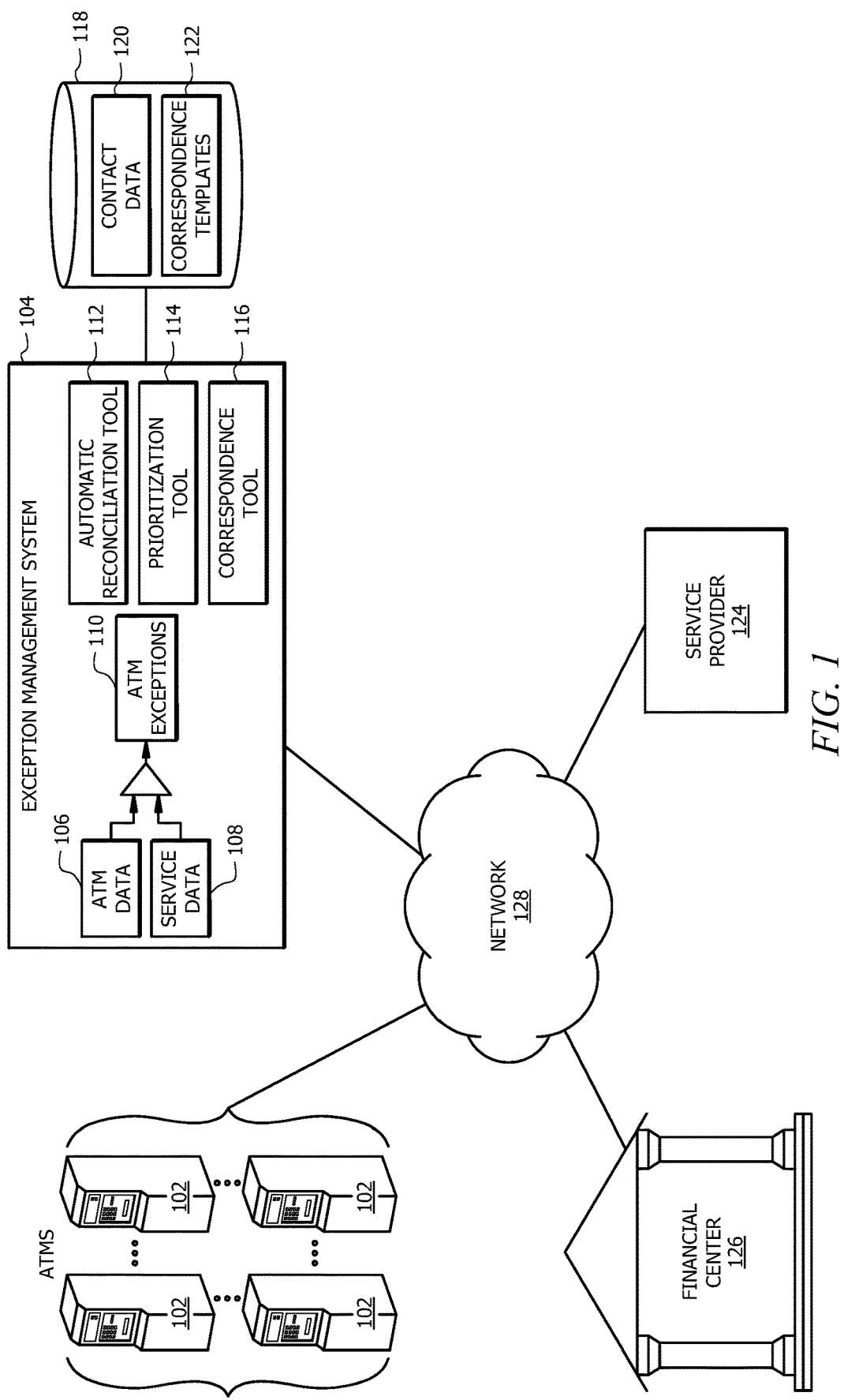
FIG. 1 is a schematic diagram of an example system for handling ATM exceptions.

As described above, prior to this disclosure, there was a lack of tools for efficiently and reliably monitoring and resolving ATM exceptions. The system described in this disclosure solves the technical problems of previous technology. The system facilitates a customizable approach to automatically reconciling a certain subset of the exceptions, appropriately prioritizing a plurality of detected ATM exceptions, and/or providing efficient correspondence tools for resolving other ATM exceptions.

In some embodiments (see FIGS. 2A-C and 3 and corresponding description below), an automatic reconciliation tool may facilitate the automated resolution of certain ATM exceptions. For instance, the automatic reconciliation tool may identify a root cause of a given exception based on properties of the exception (e.g., the identity of the associated ATM machine, the service provider tasked with servicing the ATM, etc.). For certain root causes, predefined correspondence may be prepared for certain root causes. This correspondence may be automatically provided to the service provider to initiate resolution of the exception. The correspondence may include a link to a special webform which allows the service provider to input the needed information in the correct format for efficiently resolving the exception.

In some embodiments (see FIGS. 4 and 5 and corresponding description below), a prioritization tool determines an appropriate order for efficiently and effectively resolving exceptions. The prioritization tool generally determines a priority score for each exception (e.g., based on the age, monetary amount, type, etc.) and generates a queue with the exceptions ordered according to these scores. The prioritization tool helps ensure that high priority (e.g., exceptions associated with large amounts of money, exceptions that have aged near a statutory deadline, and/or exceptions impacting client-facing services) are handled first. In situations where resources for resolving exceptions are limited, the prioritization tool may particularly prevent statutory deadlines from expiring before high priority exceptions are resolved.

In some embodiments (see FIGS. 6 and 7 and corresponding description below), a correspondence tool facilitates resolution of ATM exceptions via a user-interface provided to an associate. The correspondence tool may map detected ATM exceptions to the correct associates (e.g., ATM analysts tasked with resolving ATM exceptions). Information about the exception is viewable alongside other reference materials for researching the exception, thereby facilitating the efficient identification of the information needed to resolve the exception. Once this information is identified, the associate may provide an input (e.g., via drop down menu) to provide an indication of information needed to resolve the exception. This information is provided to the correspondence tool which automatically generates and sends the appropriate correspondence to the appropriate party (e.g., a service provider or a financial center) to resolve the exception. When a response is received, the correspondence tool passes the relevant information to the user-interface so that the associate can perform further review to determine the status of the exception (i.e., whether it is resolved based on the information provided in the response or whether further information is needed).

ATM Management System

FIG. 1 is a schematic diagram of an example system 100 for managing ATMs 102. The system 100 includes the ATMs 102, an exception management system 104, one or more databases 118, one or more service providers 124, one or more financial centers 126, and a network 128. The ATMs 102 are generally any type of automated teller machines. The ATMs 102 generally include an interface (e.g., a screen and keys and/or a touchscreen) for interacting with a user, such as a client of a financial center 126 performing a transaction (e.g., withdrawal of cash, deposit of cash, etc.). The ATMs 102 typically include a card reader for scanning a card associating a user to one or more corresponding accounts accessible via the ATM 102. Each ATM 102 generally stores cash, for example, in a cash drawer which may be accessed by a service provider 124 or a financial center 126 to remove excess cash and/or restock with cash. The system 100 may include any number of ATMs 102 from one to hundreds or more. The ATMs may be deployed at different locations. For instance, a subset of the ATMs 102 may be located at businesses, public spaces, and/or any other locations. These ATMs 102 may be serviced by a third-party service provider 124. Another subset of the ATMs 102 may be located at financial centers 126 (e.g., banks). These ATMs 102 may be serviced by the financial center 126 where (e.g., inside or outside of which) the ATMs 102 are located. Each of the ATMs 102 may be implemented using the device 800 described below with respect to FIG. 8.

The exception management system 104 may be any computing device, or collection of computing devices, configured to receive information with the ATMs 102. The exception management system 104 may be implemented using the processor, memory, and interface of device 800 described with respect to FIG. 8 below. The exception management system 104 is generally configured to detect ATM exceptions 110 based on a comparison of ATM data 106 to service data 108 provided by the service provider(s) 124 and financial center(s) 126 tasked with servicing the ATMs 102. The ATM data 106 generally corresponds to information about transactions (e.g., withdrawals, deposits, etc.) performed using the ATMs 102. The service data 108 corresponds to information about cash added to or removed from the ATMs 102 when serviced by a service provider 124 or financial center 126. Generally, any discrepancy detected between the transaction record associated with the ATM data 106 and the service record associated with the service data 108 is determined to be an ATM exception 110. For instance, an ATM exception 110 may correspond to a case where a service provider 124 or financial center 126 has reported that an ATM 102 was not storing the same amount of cash expected based on the transaction record of the ATM data 106. An ATM exception 110 may be associated with a particular transaction (e.g., with a particular user withdrawing cash from or depositing cash in an ATM 102) or with a service event for an ATM 102 (e.g., a particular service event where cash is added to or removed from the ATM 102 by a service provider 124 or financial center 126).

The ATM exceptions 110 may be provided to any one or more of an automatic reconciliation tool 112, a prioritization tool 114, and a correspondence tool 116. Each of these various tools 112, 114, 116 solves technical problems of previous technology for resolving ATM exceptions, as described further below. In various embodiments, one, two, or all three of the tools may be implemented within the exception management system 104.

The automatic reconciliation tool 112 facilitates the automated resolution of certain ATM exceptions 110. The automatic reconciliation tool 112 may be implemented using the processor, memory, and network interface of the device 800 described with respect to FIG. 8 below. For example, instructions (e.g., reconciliation instructions 808 of FIG. 8) may be stored in a memory (e.g., memory 804 of FIG. 8) and executed by a processor (e.g., processor 802 of FIG. 8) to implement the automatic reconciliation tool 112. The automatic reconciliation tool 112 may identify a root cause of a given exception 110 based on properties of the exception (e.g., the identity of the associated ATM 102, the service provider 124 or financial center 126 tasked with servicing the ATM 102, etc.). Predefined correspondence templates 122 may be used to automatically prepare correspondence for certain root causes. This correspondence may be automatically provided to the service provider 124 or financial center 126 to initiate resolution of the ATM exception 110. The correspondence may include a link to a special webform which allows the service provider to input information in the correct format for efficiently resolving the exception 110. The automatic reconciliation tool 112 and its operation are described in greater detail with respect to FIGS. 2A-C and 3 below.

The prioritization tool 114 generally determines an appropriate order for efficiently and effectively resolving ATM exceptions 110 and generates a queue for handling these exceptions 110. The prioritization tool 114 may be implemented using the processor, memory, and network interface of the device 800 described with respect to FIG. 8 below. For example, instructions (e.g., prioritization instructions 816 of FIG. 8) may be stored in a memory (e.g., memory 804 of FIG. 8) and executed by a processor (e.g., processor 802 of FIG. 8) to implement the prioritization tool 114. The prioritization tool 114 generally determines a priority score for each exception 110 (e.g., based on the age, amount, type, etc.) of the exception 110 and generates a queue with the ATM exceptions 110 ordered according to these scores. The prioritization tool 114 helps ensure that higher priority exceptions 110 (e.g., exceptions associated with large amounts of money, exceptions that have aged near a statutory deadline, and exceptions impacting client services) are handled before lower priority exceptions (e.g., small dollar amount exceptions, new exceptions, etc.). The prioritization tool 114 and its operation are described in greater detail with respect to FIGS. 4 and 5 below.

The correspondence tool 116 facilitates resolution of ATM exceptions 110 via a user-interface provided to an associate. The correspondence tool 116 may be implemented using the processor, memory, and network interface of the device 800 described with respect to FIG. 8 below. For example, instructions (e.g., correspondence instructions 818 of FIG. 8) may be stored in a memory (e.g., memory 804 of FIG. 8) and executed by a processor (e.g., processor 802 of FIG. 8) to implement the correspondence tool 116. The correspondence tool may use contact data 120 (described further below and with respect to FIGS. 6 and 7) to map detected ATM exceptions 110 to correct associates (e.g., ATM analysts tasked with resolving ATM exceptions 110). Information about the ATM exception 110 is made viewable alongside other reference materials for researching the ATM exception 110, thereby facilitating the efficient identification of which information is needed to resolve the ATM exception 110. Once this information is identified, the associate may provide an input (e.g., via drop down menu) to provide an indication of the information needed to resolve the ATM exception 110. For example, the associate may indicate that a recount or resettlement of cash collected from one or more ATMs 102 is needed to resolve a given exception 110. This information is provided to the correspondence tool 116 which generates and sends correspondence (e.g., an email or other electronic communication) to the appropriate service provider 124 or financial center 126 to resolve the ATM exception 110. When a response is received, the correspondence tool 116 passes the relevant information to the user-interface so that the associate can perform further review to identify the status of the ATM exception 110. The correspondence tool 116 and its operation are described in greater detail with respect to FIGS. 6 and 7 below.

Database(s) 118 are generally one or more devices (e.g., data repositories, data warehouses, etc.) operable to receive, store, and/or transmit contact data 120 and correspondence templates 122. A database 118 may store contact data 120 and correspondence templates 122 in any appropriate format. As described in greater detail below with respect to FIGS. 2-3, the contact data 120 generally includes contact information (e.g., email addresses, business addresses, phone numbers, names, etc.) for various ATM analysts, service providers 124, financial centers 126, and the like. The contact data 120 is generally used by the exception management system 104 to facilitate the routing of correspondence and other information to the appropriate parties. As described in greater detail below with respect to FIGS. 2-3 and 6-7, the correspondence templates 122 may include predefined text for providing information and instructions to a service provider 124 or financial center 126 in order to initiate the process of resolving an exception 110. The predefined text of the correspondence templates 122 may include placeholders for providing properties (e.g., dates, amounts of money, etc.) of an exception 110. Certain correspondence templates 122 are used by the correspondence tool 116 to generate correspondence for an analyst to communicate with a service provider 124 or financial center 126 to resolve a given ATM exception 110. The database(s) 118 may further include any other information used by the exception management system 100. The database(s) 118 may be implemented using the processor, memory, and interface of device 800 described with respect to FIG. 8 below.

The service provider(s) 124 are generally any entities tasked with servicing the ATMs 102. For example, the service provider(s) 124 may include businesses which operate armored car services that transport cash to and from ATMs 102. The financial center(s) 126 may be banks where a portion of the ATMs 102 are located. A financial center 126 may be associated with the same business or entity that operates the exception management system 104. For example, ATMs 102 located at or near a financial center 126 may be serviced by the financial center 126 rather than using a third-party service provider 124. Each of the service provider(s) 124 and the financial center(s) 126 may operate devices which facilitate communication with the exception management system 104 (e.g., via network 122). For instance, personal computers, smartphones, and the like may be operated by individuals affiliated with the service provider(s) 124 and financial center(s) 126 and used to provide service data 108 and any other information requested to resolve ATM exceptions 110. Devices used by the service provider(s) 124 and financial center(s) 126 may be implemented using the processor, memory, and interface of device 800 described with respect to FIG. 8 below.

Network 128 facilitates communication between and amongst the various components of the system 100. This disclosure contemplates network 128 being any suitable network operable to facilitate communication between the components of the system 100. Network 128 may include any interconnecting system capable of transmitting audio, video, signals, data, messages, or any combination of the preceding. Network 128 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an example operation of the system 100, ATM data 106 and service data 108 are received for an ATM 102. In this example, the ATM data 106 indicates that the ATM 102, as of the date that the ATM 102 was serviced, held $80,000 in cash (i.e., based on the record of withdrawals and deposits at the ATM 102). In this example, the service data 108 indicates that the ATM held $70,000 on the date that the ATM 102 was serviced. The exception management system 104 compares the values (i.e., $80,000 and $70,000) associated with the ATM data 106 and the service data 108 and determines that an ATM exception 110 is detected because of the difference in these values. In other words, the ATM exception 110 in this example case is a shortage of $10,000. A similar process is repeated to detect any other ATM exceptions 110 associated with the other ATMs 102.

In this example case, the ATM exceptions 110 are provided to the automatic reconciliation tool 112 where a subset of the ATM exceptions are reconciled automatically. As described further below with respect to FIGS. 2 and 3, the automatic reconciliation tool 112 may identify a root cause of a given exception 110 based on properties of the exception 110. For instance, for the example exception 110 described above, the root cause may be identified as a possible miscount of cash by the service provider 124 or financial center 126. A predefined correspondence template 122 may be used to automatically prepare and send correspondence (e.g., an email) to request action and/or information to resolve the ATM exception 110. The correspondence may, for example, include a link to a special webform which allows the service provider 124 or financial center 126 to input an updated amount of cash counted for the ATM 102 after a review has been performed. If the information provided in the webform solves the discrepancy associated with the ATM exception 110, then the automatic reconciliation tool 112 may automatically determine that the exception 110 is resolved.

Any remaining ATM exceptions 110 that were not resolvable using the automatic reconciliation tool 112, may be provided to the prioritization tool 114. As described with respect to FIGS. 4 and 5 below, the prioritization tool 114 may determine a priority score for each ATM exception 110 (e.g., based on the age, amount, type, etc.) of each exception 110 and generate a queue with the ATM exceptions 110 ordered according to these scores. This queue helps to ensure that exceptions 110 that higher priority exceptions (e.g., exceptions 110 associated with larger dollar amounts, that are about to expire, and/or that impact client experience) are resolved first.

The queue of ATM exceptions 110 may then be presented to the correspondence tool 116. As described further with respect to FIGS. 6 and 7 below, the correspondence tool 116 use contact data 120 to map detected ATM exceptions 110 to correct ATM analysts tasked with resolving ATM exceptions 110. Information about the ATM exceptions 110 is made viewable alongside reference materials for researching the ATM exception 110, thereby facilitating the efficient identification of which information is needed to resolve the ATM exceptions 110. Once this information is identified, the associate may provide an input (e.g., via drop down menu) to provide an indication of the information needed to resolve the ATM exception 110. This information is provided to the correspondence tool which generates and sends correspondence (e.g., an email or other electronic communication) to the appropriate person at the service provider 124 or financial center 126 to resolve the ATM exception 110. When a response is received, the correspondence tool 116 passes the relevant information to the user interface so that the analyst can perform further review to identify the status of the ATM exception 110.

While the example described above, describes exceptions 110 passing sequentially to the automatic reconciliation tool 112, the prioritization tool 114, and the correspondence tool 116, it should be understood that ATM exceptions 110 may be processed by one or more of these tools 112, 114, 116 in any order. For example, in some cases, one or more of the tools 112, 114, 116 may not be used. For instance, in some cases, the automatic reconciliation tool 112 may be used to resolve a portion of detected ATM exceptions 110 automatically, while other exceptions 110 are handled using any other approach. In other cases (e.g., when there are not a great number of ATMs 102 managed by the exception management system 104), the prioritization tool 114 may generate a queue of ATM exceptions 110, and any approach (e.g., including previous approaches) may be employed to resolve the ATM exceptions 110 in the order specified by the queue. In some cases, all exceptions 110 may be handled in a first-in-first-out fashion using the correspondence tool 116 alone.

Automatic Reconciliation Tool

FIG. 2 is a diagram 200 illustrating an example of the automatic reconciliation tool 112 of FIG. 1 and its operation in more detail. As described above, the automatic reconciliation tool 112 generally facilitates automated resolution of certain ATM exceptions 110. As illustrated in FIG. 2, the automatic reconciliation tool 112 may include a root cause determination module 204 which uses associated party information 202 to determine an exception profile 206 for an exception 110. The associated party information 202 generally includes information about which service provider 124 or financial center 126 services the ATM 102 associated with the exception 110. For example the associated party information 110 may include an identifier of the service provider 124 or financial center 126 tasked with servicing the ATM 102 associated with the ATM exception 110. The associated party information 202 may be determined from or may include a portion of the ATM data 106 and/or service data 108 of FIG. 1. As described above with respect to FIG. 1, the automatic reconciliation tool 112 may be implemented using the processor, memory, and network interface of the device 800 of FIG. 8, which is described below.

The exception profile 206 determined by the root cause determination module 204 includes a root cause 208 of the exception 110 and exception parameters or characteristics 210. The root cause determination module 204 may be implemented by executing corresponding instructions (e.g., the root cause identification instructions 810 of FIG. 8) using a processor (e.g., the processor 802 of FIG. 8). The root cause 208 generally corresponds to the underlying cause of the discrepancy or error associated with the exception 110. For example, the root cause 208 may be that the service provider 124 or financial center 126 has an unsettled ATM deposit, an ATM event (e.g., dispensing cash) is reported incorrectly, that information about multiple ATMs 102 have been combined into a single record entry, that cash has been moved between different ATMs 102, that an ATM 102 has been settled with a cash shortage greater than a predefined amount, and the like. The exception parameters 210 generally include the items of information which should be provided and/or which are needed to resolve the exception 110 with the root cause 208. For example, the exception parameters 210 may include an amount of money by which the transaction data 106 of FIG. 1 indicates an ATM 102 is short or in excess following a servicing event by a service provider 124 or financial center 126 and the action that should be taken to resolve the exception 110. For instance, the exception parameters 210 may include an amount of money in excess following servicing of an ATM 102 and an indication that the cash removed from the ATM 102 should be recounted, records should be reviewed, and results should be reported.

The exception profile 206 is provided to a correspondence generation module 212 which automatically generates correspondence 214 for resolving the exception 110. The correspondence generation module 212 may be implemented by executing corresponding instructions (e.g., the correspondence generation instructions 812 of FIG. 8) using a processor (e.g., the processor 802 of FIG. 8). The correspondence 214 is generally an email or other electronic communication. The correspondence 214 may include a link 216 to a response form 224. The correspondence 214 is generated using the correspondence templates 122, which may be stored in the database(s) 118 described above with respect to FIG. 1. The correspondence templates 122 include for each predefined root cause 218a,b a corresponding correspondence template 220a,b and response form template 222a,b. Each correspondence template 220a,b includes an email or other electronic communication to provide to a service provider 124 or financial center 126 for resolving an exception 110 associated with the corresponding root cause 218a,b. For example, a correspondence template 220a,b may include language to provide to the service provider 124 or financial center 126 with placeholders for inserting specific exception parameters 210 associated with the exception 110.

An example of a correspondence template 220a,b is illustrated in FIG. 2B. As illustrated in FIG. 2B, the correspondence template 220a,b may include a "to line" with a contact information placeholder 252 which is automatically populated with contact information (e.g., an email address) for the service provider 124 or financial center 126 to which the correspondence 214 is to be sent. A "from line" includes a contact information placeholder 254 which is automatically populated with contact information associated with the automatic reconciliation tool 112 (e.g., an email address of an operator or analyst associated with the ATM exception management system 104 of FIG. 1). The "subject line" includes text from the correspondence template 220a,b used to generate the correspondence 214 along with an identifier placeholder 256 for inserting the name of the service provider 124 of financial center 126, an ATM identifier placeholder 258 for inserting a name, serial number of other identifier of the ATM 102 associated with the exception 110, and a case number placeholder 260 for inserting an identifier assigned to the exception 110. The body of the correspondence 214 includes predefined text from the correspondence template 220a,b used to generate the correspondence 214 along with additional information such as a settlement date placeholder 262, the ATM identifier placeholder 258, an amount placeholder 264, and a resolution deadline placeholder 266. Each of the contact information placeholders 252, 254, servicer identifier placeholder 256, ATM identifier placeholder 258 case identifier placeholder 260, settlement date placeholder 262, amount placeholder 264, and deadline placeholder 266 may be linked to particular entries of the exception parameters 210 such that the appropriate information may be automatically incorporated into the correspondence template 220a,b for the exception's root cause 208 in order to generate correspondence 214. The correspondence template 220a,b also includes a link placeholder 268 for inserting a link 216 to a webform 224 for providing information to resolve the exception 110. The webform 224 is described further below and an example webform 224 is illustrated in FIG. 2C.

Figure 2A:
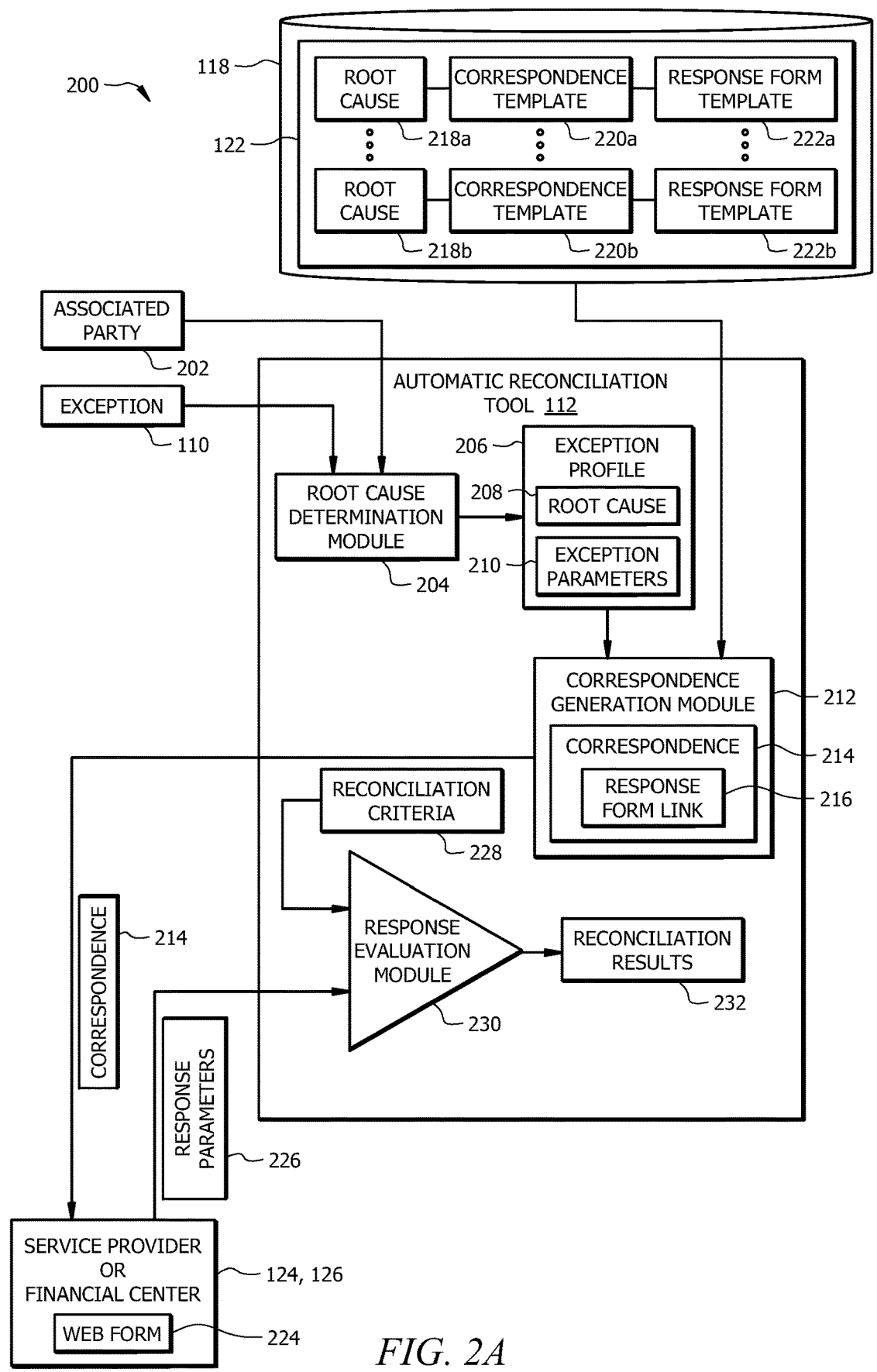
FIG. 2A is a diagram illustrating an example of the automatic reconciliation tool of the system illustrated in FIG. 1.

Returning to FIG. 2A, correspondence 214 generated from a given template 220a,b includes text from the template 220a,b with placeholder information (e.g., the information associated with the contact information placeholder 252, 254, servicer identifier placeholder 256, ATM identifier placeholder 258, case identifier placeholder 260, settlement date placeholder 262, amount placeholder 264, deadline placeholder 266, and link placeholder 268 of FIG. 2B) inserted based on the exception parameters 210. The response form link 216 may be an html link, or any other appropriate information, for accessing a webform 224 to provide requested information to resolve the exception 110. The correspondence 214 is provided to the appropriate service provider 124 or financial center 126 that is associated with the exception 110. An individual at the service provider 124 or financial center 126 may review the correspondence 214 and access the webform 224. The webform 224 is generated based on the webform template 222a,b for the root cause 206 of the exception 110. An example of a webform 224 is illustrated in FIG. 2C. As illustrated in FIG. 2C, the webform 224 may include a number of fields 272, 274, 276 for providing information to resolve the exception 110. In this example, the webform 224 includes a first field 272 for providing a residual reporting date, a second field 274 for providing an amount to report, and a field 276 for providing an indication (e.g., a selection of yes or no) of whether information is confirmed. The example webform 224 also includes a submit button 278. Upon selection the submit button 278, the response information associated with the values provided in fields 272, 274, 276 is provided to the automatic reconciliation tool 112. In some embodiments, a webform 224 may include only a field 276 for confirming receipt of the webform 224 and associated correspondence 214

Returning to FIG. 2A, a response evaluation module 230 of the automatic reconciliation tool 112 compares the response parameters 226 to predefined reconciliation criteria 228 for resolving the exception 110 to determine reconciliation results 232 (i.e., a determination of whether the exception 110 is resolved or not). The response evaluation module 230 may be implemented by executing corresponding instructions (e.g., the response evaluation instructions 814 of FIG. 8) using a processor (e.g., the processor 802 of FIG. 8). Generally the reconciliation criteria 228 for resolving the exception include values or characteristics which should be included in the response parameters 226 in order for the exception 110 to be considered resolved. For instance, if the webform 224 requested an amount of money counted in a review of a service, the response parameters 226 may include the amount counted and the reconciliation criteria 228 may include a requirement that the amount have a certain value or be within a certain range of values in order for the exception 110 to be resolved.

If the exception 110 is not resolved according to the reconciliation results 232, a further correspondence 214 may be generated and provided based on information needed to resolve the exception 110. For example, the further correspondence 214 may include an indication that the previously provided response parameters 226 were not as expected and provide instructions for sending further information to resolve the exception 110. If an exception 110 is not satisfactorily resolved using the automatic reconciliation tool 112 (e.g., within a predefined amount of time), the exception may be handled manually or using the correspondence tool 116 described further below with respect to FIGS. 6 and 7. The correspondence tool 112 generally maintains a record of all correspondence 214 provided and response parameters 226 received. This record may facilitate improved audits in the future and improved tracking of performance of various service providers 124 and financial centers 126.

In some embodiments, correspondence 214 may not include a request for any response parameters 226. In such embodiments, the correspondence 214 may not include a response form link 216, and the service provider 124 or financial center 126 is not expected to provide any information. For example, the exception 110 may have needed some sort of reporting to occur (e.g., for regulatory purposes or the like). The correspondence 214 may include this reporting, and no further review is needed for the exception 110 to be considered resolved. Generally a subset of all detected exceptions 110 from FIG. 1 may be amenable to root cause analysis and automatic reconciliation using the automatic reconciliation tool 112. Another subset of the exceptions 110 may require at least some decision by a human (e.g., using the correspondence tool 116 described below with respect to FIGS. 6 and 7).

Figure 3:
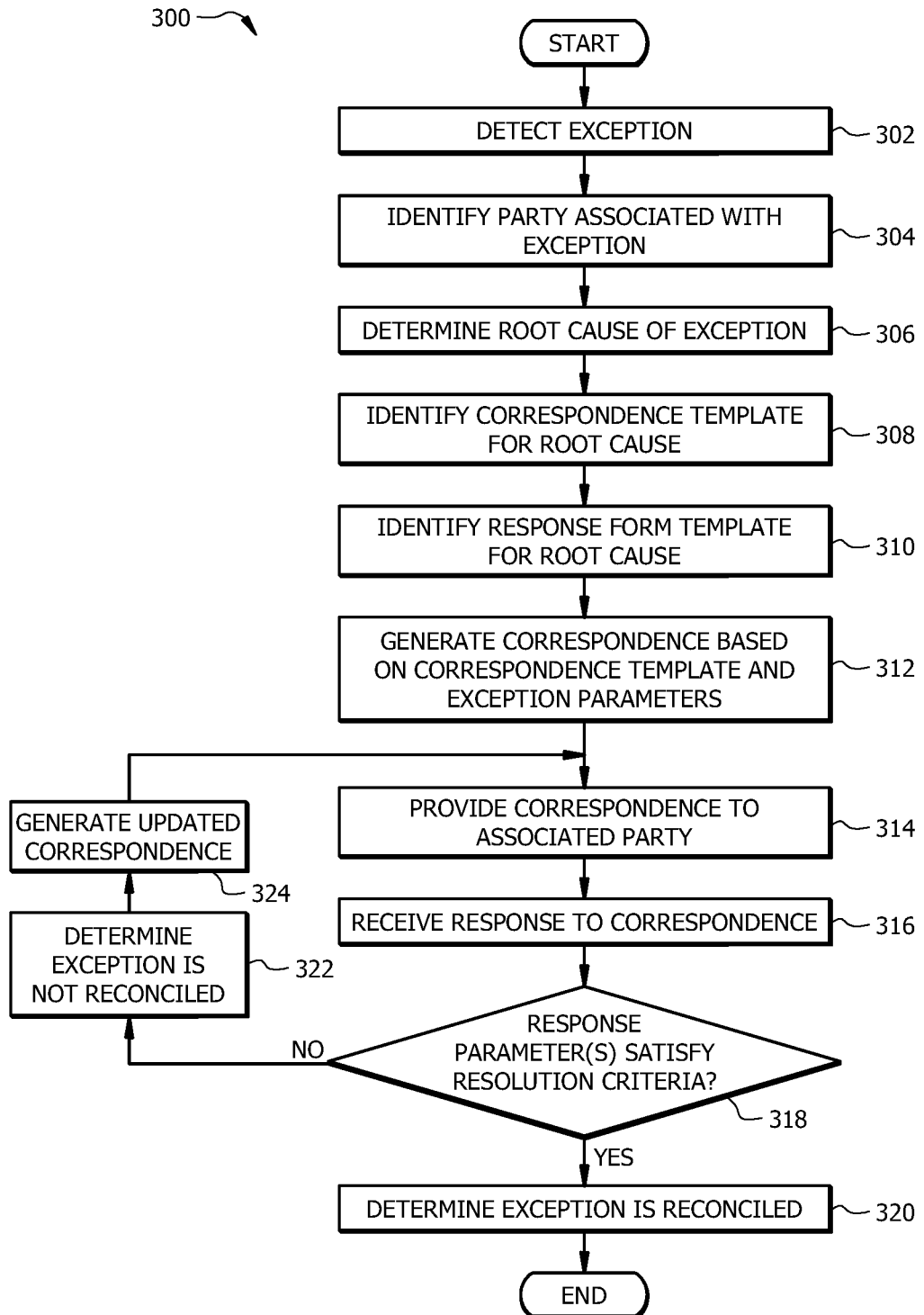
FIG. 3 is a flowchart illustrating an example method of operating the auto-reconciliation tool of the system illustrated in FIG. 1.

FIG. 3 is a flowchart of an example method 300 for automatically resolving, or reconciling, certain ATM exceptions 110. The automatic reconciliation tool 112 described in FIGS. 1 and 2A-C may implement method 300. Method 300 may begin at step 302 where an exception 110 is detected or received. For example, the exception 110 may be detected as described above with respect to FIG. 1 through the comparison of ATM data 106 to service data 108. A discrepancy between these data 106, 108 is generally identified as an ATM exception 110.

At step 304, a party associated with the exception 110 is identified (i.e., associated party information 202 of FIG. 2A is determined or received). For example, the ATM data 106 and/or the service data 108 for the ATM 102 associated with the exception 110 may include the identity of the service provider 124 or financial center 126 tasked with servicing the ATM 102.

At step 306, the root cause 208 of the exception 110 is determined. The root cause 206 is generally determined based on the exception parameters 210. For example, if the exception parameters 210 include characteristics (e.g., a discrepancy between ATM data 106 and service data 108) associated with a service provider 124 or financial center 126 having an unsettled ATM deposit, a corresponding unsettled-deposit root cause 208 is determined. As another example, if the exception parameters 210 include characteristics (e.g., a discrepancy between ATM data 106 and service data 108) associated with an ATM event (e.g., dispensing cash) being reported incorrectly, a corresponding incorrect-reporting root cause 208 is determined. Generally, the event parameters 210 for the exception 110 may be associated with one or more root causes 208. However, for clarity and conciseness a single root cause 208 is described in the example of FIG. 3.

At step 308, a correspondence template 220a,b is identified for the root cause 208 determined at step 306. For example, the template 220a,b may be selected for the root cause 218a,b that matches the root cause 208 determined at step 306. The response form template 220a,b is similarly identified for the root cause 208 at step 312.

At step 312, the correspondence 214 is generated for the root cause 208 using the correspondence template 220a,b identified at step 308 and the exception parameters 210 to fill in information in the template 220a,b, as described above with respect to FIGS. 2A and 2B. The correspondence 214 is provided to the service provider 124 or financial center 126 at step 314. For example, the correspondence 214 may be sent as an email or any other form of electronic communication. As described above with respect to FIGS. 2A and 2B, the correspondence 214 may include a link 216 for accessing the response webform 224.

At step 316, response parameters 226 are received from the service provider 124 or financial center 126. The response parameters 226 may include any appropriate information needed to resolve the exception 110. For example, the response parameters 226 may include information provided in the fields 272, 274, 276 of the example webform 224 described above with respect to FIG. 2C.

At step 318, the automatic reconciliation tool 112 (e.g., the response evaluation module 230 described above with respect to FIG. 2A) determines whether the response parameters 226 received at step 316 satisfy the predefined reconciliation criteria 228. For instance, if the webform 224 requested an amount of money determined in a resettlement (e.g., provided in an amount field 274 of the example webform 224 of FIG. 2C), the response parameters 226 may include the amount counted and the reconciliation criteria 228 may include a requirement that the amount have a certain value or be within a certain range of values in order for the exception 110 to be resolved. If the reconciliation criteria 228 are satisfied at step 318, the exception 110 is determined to be resolved or reconciled at step 320. Otherwise, if the reconciliation criteria 228 are not satisfied at step 318, the method 300 proceeds to step 322 and determines that the exception is not resolved or reconciled.

At step 324, the automatic reconciliation tool 112 may generate an updated correspondence 214. The updated correspondence 214 may be based on the same or a different correspondence template 220a,b and is generally configured to request any information still needed to resolve the exception 110. For example, if an amount provided in the response parameters 226 is not within a range indicated by the reconciliation criteria 228, the updated correspondence 214 may include a request for further review and/or explanation of the discrepancy. Updated correspondence 214 may be escalated such that it is provided to a related party associated with the exception 110 (e.g., a manager or management group of the service provider 124 or financial center 126 tasked with servicing the ATM 102 associated with the exception 110). The automatic reconciliation tool 112 may return to step 314 and provide this correspondence 214 to the service provider 124 or financial center 126, as described above, and the subsequent steps described above may be repeated (e.g., either until the exception 110 is reconciled at step 320 or the exception 110 is considered unreconciled at step 322 and no further attempts at automatic reconciliation are appropriate).

Prioritization Tool

Figure 4:
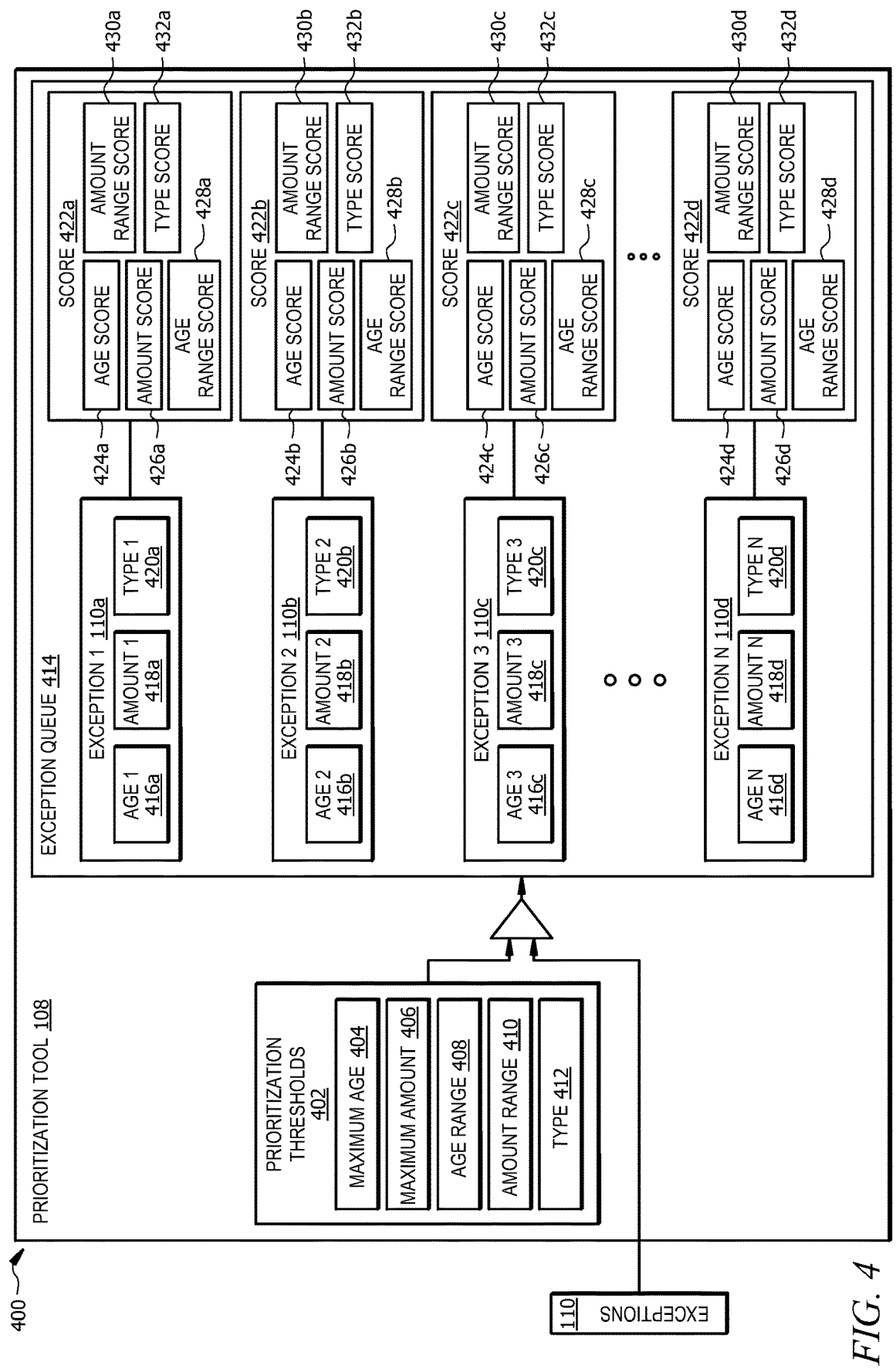
FIG. 4 is a diagram illustrating an example of the prioritization tool of the system illustrated in FIG. 1.

FIG. 4 is a diagram 400 illustrating an example of the prioritization tool 114 of FIG. 1 and its operation in more detail. Previous technology generally relied on a first-in-first-out approach to handling ATM exceptions. Thus, using previous technology, an analyst may be working to resolve an exception from several weeks ago (e.g., because of a large back log of exceptions to resolve). This relatively old exception may be associated with a relatively low priority issue such as a $10 out-of-balance exception, while a more recently received exception may be associated with a larger amount of money (e.g., an exception associated with $50, 000). Previous technology may allow this more recently received and higher value exception to go unresolved for a long period of time. In some cases, the higher value exception may reach a statutory time limit beyond which a resolution is not possible. The prioritization tool 114 solves these and other problems of previous technology by dynamically prioritizing which ATM exceptions 110 should be handled first (i.e., using queue 414 illustrated in FIG. 4). As described above with respect to FIG. 1, the prioritization tool 114 may be implemented using the processor, memory, and network interface of the device 800 of FIG. 8, which is described below (e.g., using prioritization instructions 816).

The prioritization tool 114 determines a priority score 422a-d for each exception 110-d of a set of ATM exceptions 110 provided to the prioritization tool 114 and generates a queue 414 of the ATM exceptions 110a-d ordered according to these scores 422a-d. The prioritization tool 114 helps ensure that a higher priority exception such as exception 110a is resolved before lower priority exceptions 110 such as an $n^{th}$ exception 416d.

The prioritization tool 114 compares outstanding exceptions 110 to a predefined set of prioritization thresholds 402 in order to determine a prioritization score 422a-d for each exception 110. Each exception 110a-d is characterized by an age 416a-d (i.e., an amount of time, e.g., in days, since an event that triggered the exception 110a-d has occurred), an amount 418a-d (i.e., an amount of money associated with the exception 110a-d), and a type 420a-d (e.g., whether the exception 110a-d is associated with a credit or debit transaction, what service provider 124 or financial center 126 is associated with the exception 110a-d, and the like).

For example, an age 416a-d of an exception 110a-d associated with a particular transaction between a client and the ATM 102 associated with the exception 110a-d may be the amount of time (e.g., in days) since the transaction was performed. As another example, an age 416a-d of an exception 110a-d associated with a service provider 124 or financial center 126 servicing an ATM 102 may be the amount of time (e.g., in days) since the service was performed (e.g., since cash was added to and/or removed from the ATM 102). As an example, an amount 418a-d of an exception 110a-d associated with a transaction between a client and an ATM 102 may be the amount of cash withdrawn and/or deposited in the transaction. An amount 418a-d of an exception 110a-d associated with a service provider 124 or financial center 126 servicing an ATM 102 may be the amount of cash added to and/or removed from the ATM 102 when the service was performed. A type 420a-d of a transaction may be whether a transaction between a client and the ATM 102 was a credit transaction or a debit transaction. The type 420a-d of an exception 110a-d may also include the identity of the service provider 124 or financial center 126 tasked with servicing the ATM 102 associated with the exception 110a-d.

The age 416a-d, amount 418a-d, and type 420a-d of each exception 110a-d is generally compared to the prioritization thresholds 402 in order to determine an appropriate prioritization score 422a-d for each exception 110a-d. The prioritization thresholds 402 generally include predefined values and/or rules for generating, based on these comparisons, the prioritization scores 422a-d for the exceptions 110a-d. The prioritization thresholds 402 may include a maximum age threshold 404, a maximum amount threshold 406, an age threshold 408, an amount range threshold 410, and an exception type threshold 412. The maximum age threshold 404 is generally a predefined age (e.g., of thirty days or greater) of an exception 110a-d above which the exception 110a-d should be given a higher priority score 422a-d. If an exception 110a-d has an age 416a-d that is equal to or greater than the maximum age threshold 404, then a predefined age score 424a-d is added to the prioritization score 422a-d. The age score 424a-d added to the prioritization score 422a-d may be proportionate to the age 416a-d of the exception 110a-d, such that an exception 110a-d with a greater age 416a-d will have a higher age score 424a-d included in the prioritization score 422a-d based on the maximum age threshold 404. In some cases, exceptions 110a-d may have a statutory deadline (e.g., of several weeks or months), such that beyond this deadline no resolution is possible (i.e., because of relevant rules or laws). Such statutory deadlines may be used as a cutoff such that if the age 416a-d of an exception 110a-d is greater than a statutory deadline age, the prioritization score 422a-d may be set to a zero or another relatively low value. Such an exception 110a-d may not be included in the queue 414 because the exception 110a-d cannot be resolved.

The maximum amount threshold 406 is generally a predefined amount (e.g., of one million dollars or more) of an exception 110a-d above which the exception 110a-d should be given a higher priority score 422a-d. If an exception 110a-d has an amount 418a-d (e.g., an amount of money withdrawn or deposited in a transaction, an amount of money added or removed from an ATM 102 by a service provider 124 or financial center 126, or the like) that is equal to or greater than the maximum amount threshold 406, then a predefined amount score 426a-d is added to the prioritization score 422a-d. The amount score 426a-d added to the prioritization score 422a-d may be proportionate to the amount 418a-d of the exception 110a-d, such that an exception 110a-d with a greater amount 418a-d will have a higher amount score 426a-d included in the prioritization score 422a-d based on the maximum amount threshold 406.

The age range threshold 408 is generally a predefined range of ages of exceptions 110a-d (e.g., a range from 16 to 30 days). If an exception 110a-d has an age 416a-d that is within the age range threshold 408, then a predefined age range score 428a-d is added to the prioritization score 422a-d. The age range score 428a-d added to the prioritization score 422a-d may be proportionate to, or otherwise based on, the age 416a-d of the exception 110a-d, such that an exception 110a-d with a greater age 416a-d will have a higher age range score 428a-d included in the prioritization score 422a-d based on the age range threshold 408. Similarly, the amount range threshold 410 is generally a predefined range of amounts of exceptions 110a-d. If an exception 110a-d has an amount 418a-d that is within the amount range threshold 410, then a predefined amount range score 430a-d is added to the prioritization score 422a-d. The amount range score 430a-d added to the prioritization score 422a-d may be proportionate to, or otherwise based on, the amount 418a-d of the exception 110a-d, such that an exception 110a-d with a greater amount 418a-d will have a higher amount range score 430a-d included in the prioritization score 422a-d based on the amount range threshold 410.

The type threshold 412 generally includes predefined exception characteristics which should be prioritized above others. For example, the type threshold 412 may indicate that an exception 110a-d associated with a credit transaction should be given a higher prioritization score 422a-d than an exception 110a-d associated with a debit transaction. As another example, the type threshold 412 may include a type score 432a-d that should be included in a prioritization score 422a-d based on the service provider 124 or financial center 126 associated with an exception 110a-d. For example, a service provider 124 that has been observed to responds slowly with requested information to resolve an exception, may be associated with a higher priority score 422a-d. This may cause actions needed for the resolution of exceptions 110a-d associated with this service provider 124 to be started sooner such that the exceptions 110a-d may still be resolved despite anticipated delays from the service provider 124.

The prioritization score 422 may be determined from the sum of the scores 424a-d, 426a-d, 428a-d, 430a-d, 432a-d determined for each of the prioritization thresholds 402 described above. The total prioritization score 422a-d (P) may be determined according to:

$$P = P_{maximum\ age} + P_{maximum\ amount} + P_{age\ range} + P_{amount\ range} + P_{type}$$

where $P_{maximum\ age}$ is the age score 424a-d determined for the maximum age threshold 404, $P_{maximum\ amount}$ is the amount score 426a-d determined for the maximum amount threshold 408, $P_{age\ range}$ is the age range score 428a-d determined for the age range threshold 408, $P_{amount\ range}$ is the amount range score 430a-d determined for the amount range threshold 410, and $P_{type}$ is the type score 432a-d determined for the exception type threshold 412.

The ATM exceptions 110a-d are arranged in a queue 414 such that the exceptions 110a-d may be provided in an appropriate order to the correspondence tool 116 in order from highest to lowest priority. The queue 414 may reduce or eliminate cases where high priority exceptions 110 are not resolved in a timely manner (e.g., before a predefined statutory deadline). The prioritization tool 114 may generate and/or update the queue 414 at a predefined interval (e.g., daily, after a certain number of new exceptions 110 are detected, or the like), thereby facilitate the dynamic population of the queue 414 with new inbound ATM exceptions 110.

Generally, each threshold 404, 406, 408, 410, 412 may be weighted to have a larger or smaller impact on the resulting prioritization score 422a-d as appropriate. In an example embodiment, the scores 424a-d, 426a-d, 428a-d, 430a-d, 432a-d determined from each of the thresholds are weighted from greatest to least in the order of maximum age threshold 404, maximum amount threshold 406, age range threshold 408, amount range threshold 410, and exception type threshold 412. For instance, in an example embodiment, the exceptions 110a-d are arranged in order from greatest age 416a-d to smallest age 416a-d.

In another example embodiment, the first exception 110a does not have the greatest age 416a but has an amount 418a that is larger than that of the other exceptions 110b-d. In this embodiment, the prioritization score 422a is largest for the first exception 110a because of the large value of the amount 418a. In another example embodiment, two exceptions 110a,b may have the same or similar ages 416a,b and amounts 418a,b. In this case, the ordering of the exceptions 110a,b may be based on the types 420a,b of the exceptions 110a,b. For example, the first exception 110a (with the higher ranking in the queue 414) may have a type 420a that is associated with a credit transaction, while the second exception 110b (with the lower ranking in the queue 414) may have a type 420b that is associated with a debit transaction. It may be beneficial to prioritize credit transactions, which may have a greater impact on client experience, over debit transaction.

Figure 6:
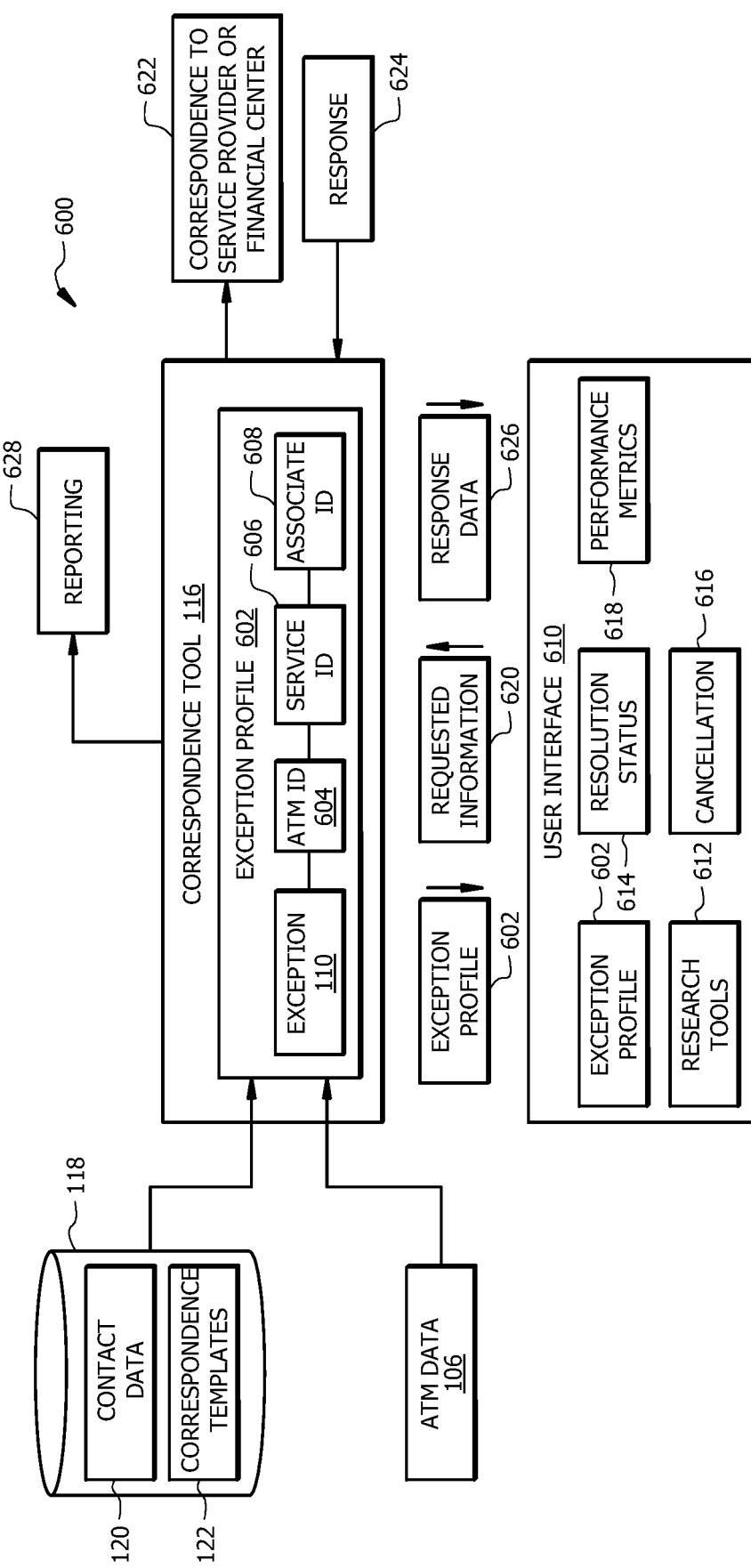
FIG. 6 is a diagram illustrating an example of the correspondence tool of the system illustrated in FIG. 1.

As another example, the first exception 110a may have a type 420a that indicates that the ATM 102 associated with the exception 110a is serviced by a service provider 124 or financial center 126 that is known to have a delayed response time when resolving exceptions 110, while the second exception 110b may have a type 420b that indicates that the ATM 102 associated with the exception 110b is serviced by a service provider 124 or financial center 126 that is known to have a relatively fast response time for resolving exceptions 110 (e.g., as determined based on performance metrics 618 described with respect to FIG. 6 below). Thus, irrespective of the order in which the exceptions 110a-d may have been identified or otherwise provided to the prioritization tool 114, the queue 414 presents the exceptions 110a-d in an order that is more suited for reliably ensuring that the most important exceptions 110a-d are acted upon first (e.g., using the correspondence tool 116 described further below with respect to FIGS. 6 and 7).

Figure 5:
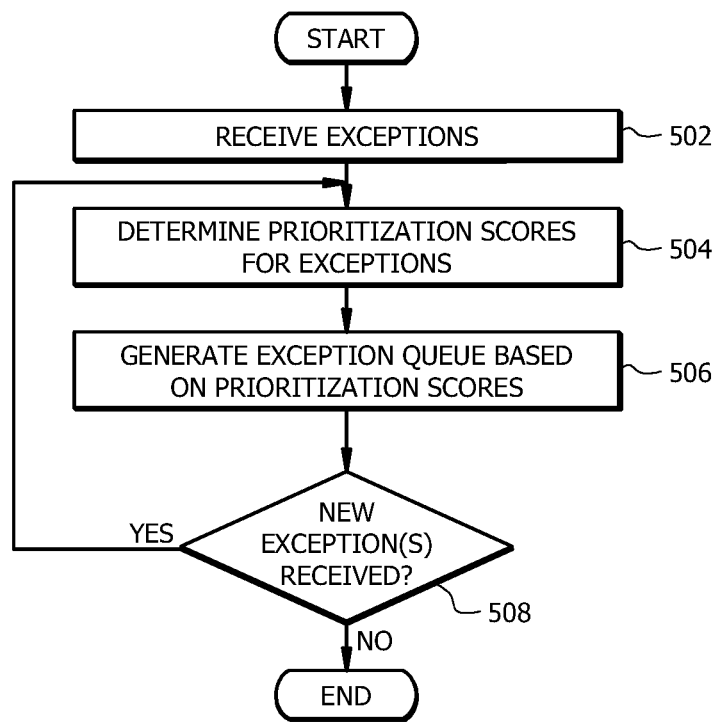
FIG. 5 is a flowchart illustrating an example method of operating the prioritization tool of the system illustrated in FIG. 1.

FIG. 5 is a flowchart of an example method 500 for generating a queue 414 for resolving ATM exceptions 110. The prioritization tool 114 of FIGS. 1 and 4 may implement method 500. The method 500 generally ensures that actions are taken to resolve higher priority ATM exceptions 110 before lower priority exceptions 110, thereby reducing or eliminating instances where high priority exceptions 110 are not timely resolved. Method 500 may begin at step 502 where exceptions 110 are received by the prioritization tool 114. The exceptions 110 may be detected as described above with respect to FIG. 1 through the comparison of ATM data 106 to service data 108. A discrepancy between these data 106, 108 is generally identified as an ATM exception 110.

At step 504, the prioritization tool 114 determines prioritization scores 422a-d for the received exceptions 110. As described above with respect to FIG. 2, the prioritization scores 422a-d are determined by comparing, for each exception 110a-d, the age 416a-d, amount 418a-d, and type 420a-d of the exception 110a-d to the corresponding prioritization thresholds 402. A score 424a-d, 426a-d, 428a-d, 430a-d, 432a-d may be determined for each of the prioritization thresholds 402, and these scores 424a-d, 426a-d, 428a-d, 430a-d, 432a-d may be summed to determine the prioritization score 422a-d. At step 506, the exception queue 414 is generated. The exception queue 414 includes the received exceptions 110a-d in an order determined by the prioritization scores 422a-d. The ATM exceptions 110a-d are generally ordered in the queue from highest prioritization score 422a-d to lowest prioritization score 422a-d.

At step 508, the prioritization tool 114 may determine whether new exceptions 110 have been received or detected. For example, each day or at any other appropriate interval, the prioritization tool 114 may determine whether other ATM exceptions 110 need to be added to the queue 414. If no new exceptions 110 have been received, the method 500 ends. If new exceptions 110 have been received, the prioritization tool 114 returns to step 504 to determine prioritization scores 422a-d. Prioritization scores 422a-d are determined for both the newly received exceptions 110 and those already in the queue 414 because priority scores 422a-d may change over time (e.g., as the ages 416a-d of the exceptions 110a-d increase over time, the age scores 424a-d and/or age range scores 428a-d may also increase).

Correspondence Tool

FIG. 6 is a diagram 600 illustrating an example of the correspondence tool 116 of FIG. 1 and its operation in more detail. The correspondence tool 116 determines an exception profile 602 based on the contact data 120, ATM data 106, and/or service data 108 for each exception 110. The correspondence tool 116 may automatically identify portions of the contact data 120 and ATM data 106 to include in the exception profile 602. The ATM data 106 includes information about transactions (e.g., withdrawals, deposits, etc.) performed using the ATMs 102. The service data 108 corresponds to information about cash added to or removed from the ATMs 102. The ATM data 106 and service data 108 may be used to identify the ATM identifier 604 and the service identifier 606. The ATM identifier 604 is an identifier (e.g., a serial number or the like) of the ATM 102 associated with the exception 110. The service identifier 606 is an identifier of the service provider 124 or financial center 126. The contact data 120 includes contact information (e.g., email addresses, business addresses, phone numbers, etc.) for various ATM analysts, service providers 124, financial centers 126, and the like. The contact data 120 is used to associate the ATM exception 110 to a corresponding associate identifier (e.g., an identifier, such as a name or email address of the ATM analyst tasked with resolving the ATM exception 110). As described above with respect to FIG. 1, the correspondence tool 116 may be implemented using the processor, memory, and network interface of the device 800 of FIG. 8, which is described below (e.g., using correspondence instructions 818).

The exception profile 602 is provided to a user interface 610 which is viewable to the associate or analyst who corresponds to the associate identifier 608. The user interface 610 thus facilitates review of the exception 110 by the appropriate associate (e.g., an ATM analyst or other user). The user interface 610 may include research tools 612 for facilitating this review. The research tools 612 may facilitate review of information associated with the exception 110, the ATM 102 associated with the exception 110, the service provider 124 or financial center 126 tasked with servicing the ATM 102, and the like (e.g., for review of the performance metrics 618 described below). For example, the research tools 612 may facilitate review of information about the ATM 102 associated with the exception 110 such as the location of the ATM 102, records of past service of the ATM 102, transaction information for the ATM 102.

The user interface 610 includes a resolution status switch/indicator 614. The resolution status switch/indicator 614 generally identifies the status of the exception to the associate operating the correspondent tool 116. For example, the resolution status switch/indicator 614 may indicate whether or not the exception is resolved. The resolution status switch/indicator 614 may optionally include other information about the exception 110, such as an age of the exception, an amount of the exception 110, and the like. The user interface 610 may include a cancellation button 616. The associate operating the user interface 610 may select the cancellation button 616 to cancel the exception 110, for example, if information external to the correspondence tool 116 (e.g., provided through a phone call or other communication external to the correspondence tool 116) indicates that the exception 110 is resolved or requires no further action. The user interface 610 may facilitate the collection and review of performance metrics 618. The performance metrics 618 may include, for example, information about how often exceptions 110 are detected for different service providers 124 and/or financial centers 126 and how reliably and rapidly these service providers 124 and/or financial centers 126 react (e.g., by providing responses 624) to resolve exceptions 110.

The associate generally interacts with the user interface 610 to indicate which information 620 should be requested from the service provider 124 or financial center 126 in order to resolve the exception 110. For example, the requested information 620 may include any information needed to resolve the exception 110 (e.g., a confirmation of resettlement of cash collected from one or more ATMs 102, an amount determined during such a resettlement, and/or the like). The requested information 620 may be the same as or similar to the information provided in the webform 224 described above with respect to FIGS. 2A and 2C. The correspondence tool 116 receives the requested information 620 and generates correspondence 622 to provide to the service provider 124 or financial center 126 associated with the exception 110. The correspondence 622 may be generated as described above with respect to FIGS. 2A and 2B. For example, the correspondence tool 116 may identify a response template 122 that corresponds to the requested information 620 and automatically generate and send the correspondence 622 to the appropriate person at the service provider 124 or financial center 126.

When a response 624 (e.g., an email or electronic communication from the service provider 124 or financial center 126) to the correspondence 622 is received by the correspondence tool 116, corresponding response data 626 is provided for review in the user interface 610. The response data 626 may include the response 624 (i.e., a copy of correspondence from the service provider 124 or financial center 126). The response data 626 may include information extracted from response 620. For example, the portion of the response 624 that is associated with the requested information 620 (e.g., an amount of settled cash or confirmation of one or more actions taken) may be included in the response data 626. The response data 626 may be based on a comparison of keywords included in the received response 624 (e.g., "a resettlement amount of $XXX was determined") and the information 620 requested to resolve the exception 110 (e.g., a request for a resettlement amount). The associate operating the user interface 610 may review the response data 626 and determine whether the exception 110 has been resolved. If the exception 110 has been resolved, the associate may operate the user interface 610 to change the status switch/indicator 614 to a "resolved" setting. Otherwise, if the exception 110 is not resolved, the associate may operate the user interface 610 to identify further information 620 to request. the process described above may be repeated until the exception 110 is resolved.

The correspondence tool 16 may generate reporting 628. The reporting 628 may include information about the exceptions 110 currently needing resolution, the performance of analysts handling the exceptions 110, and/or the responsiveness of service providers 124 or financial centers 126 associated with the exceptions 110. For example, the reporting 628 may include records of exceptions 110 currently assigned to different analysts, records of exceptions 110 handled by different analysts, records of responses 624 provided by service providers 124 and financial centers 126, and the like. The reporting 628 may include descriptions and/or visual representations (e.g., graphs, tables, etc.) of the performance metrics 618 that are also available via the user interface 610.

Figure 7:
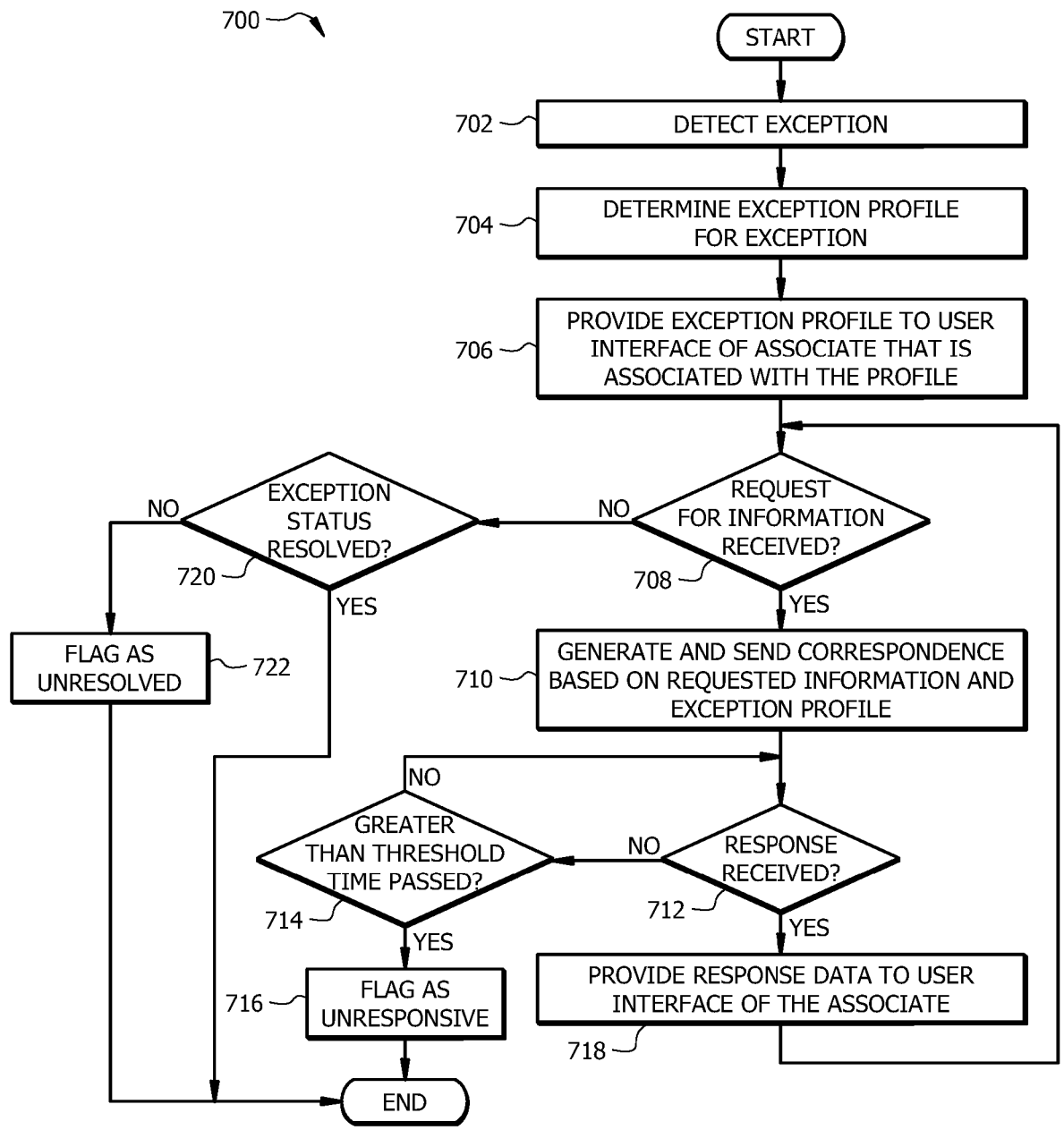
FIG. 7 is a flowchart illustrating an example method of operating the correspondence tool of the system illustrated in FIG. 1.

FIG. 7 is a flowchart of an example method 700 for generating correspondence 622 and facilitating review to resolve ATM exceptions 110. The correspondence tool 116 of FIGS. 1 and 6 may implement method 700. Method 700 may begin at step 702 where an exception 110 is detected or received. The exception 110 may be detected as described above with respect to FIG. 1 through the comparison of ATM data 106 to service data 108. A discrepancy between these data 106, 108 is generally identified as an ATM exception 110.

At step 704, an exception profile 602 is determined for the exception 110. The correspondence tool 116 determines or generates the exception profile 602 based on the contact data 120, ATM data 106, and/or service data 108 associated with the exception 110. For example, the correspondence tool 116 may identify portions of the contact data 120, ATM data 106, and/or service data 108 to include in the exception profile 602. For instance, the correspondence tool 116 may extract an ATM identifier 604 from the ATM data 106 associated with the exception 110 and a service identifier 606 from the service data 108 associated with the exception 110. The correspondence tool 116 may use the contact data 120 to associate the ATM exception 110 with the correct associate identifier 608 (e.g., an identifier, such as a name or email address of the ATM analyst tasked with resolving the ATM exception 110). This allows the exception 110 and relevant information included in the exception profile 602 to be provided to the appropriate analyst who is tasked with resolving the exception 110.

At step 706, the exception profile 602 is provided to the user interface 610 that is accessible to the appropriate associate. The user interface 610 is viewable to the associate who corresponds to the associate identifier 608. The user interface 610 facilitates review of the exception 110 by the appropriate associate (e.g., an ATM analyst or other user). As described above with respect to FIG. 6, the user interface 610 may include research tools 612 for facilitating this review. For example, the research tools 612 may facilitate review of information about the ATM 102 associated with the exception 110 such as the location of the ATM 102, records of past service of the ATM 102, transaction information for the ATM 102, and the like.

At step 708, the correspondence tool 116 determines if a request for information 620 is received from the user interface 610. For example, if the associate provides an input to request information 620 in the user interface 610, this information is provided to the correspondence tool 116. If a request for information 620 is received, the correspondence tool 116 generates and sends correspondence 622 at step 710. Generation of the correspondence 622 may involve correspondence tool 116 may identifying a response template 122 that corresponds to the requested information 620 and an appropriate recipient at the service provider 124 or financial center 126 to which the correspondence 622 should be provided, as described above with respect to FIG. 6. Automatic generation of correspondence 622 may proceed as described above with respect to FIGS. 2A-C.

At step 712, the correspondence tool 116 determines if a response 624 is received. For example, the correspondence tool 116 may intermittently review records to determine whether the response 624 has been received. If the response 624 is not received, the correspondence tool 116 proceeds to step 714 to determine if greater than a threshold response time has passed. If the threshold response time has not passed, the correspondence tool 116 generally continues to wait for the response 624 to be received (i.e., by returning to step 712). However, if the response 624 is not received within the threshold response time, the correspondence tool 116 may flag the service provider 124 or financial center 126 as being unresponsive to the exception 110. Flagged service providers 124 or financial centers 126 may be provided to analysts or managers for higher level action to resolve the exception 110.

If, at step 712, the response 624 is determined to have been received, the correspondence tool 116 proceeds to step 718. Receipt of the response 624 may trigger initiation of step 718. At step 718, the response data 626 associated with the response 624 is provided for viewing in the user interface 610. As described above with respect to FIG. 6, the response data 626 may include the response 624 (i.e., a copy of correspondence from the service provider 124 or financial center 126) and/or information extracted from response 620. For example, the portion of the response 624 that is associated with the requested information 620 (e.g., an amount of settled cash or confirmation of one or more actions taken) may be included in the response data 626. The associate operating the user interface 610 may review the response data 626 and determine whether the exception has been resolved.

The correspondence tool 116 may return to step 708 to determine if further information 620 is requested from the associate. If a request for information 620 is not received at step 708, the correspondence tool 116 may check whether the exception's status switch/indicator 614 indicates that the exception 110 is resolved at step 720. If the exception is resolved, the method 700 generally ends. If the exception 110 is still unresolved, the correspondence tool 116 may flag the exception 110 at step 722 such that actions may be elevated to particular associates or management to potentially resolve the exception 110.

While the system 100 and its components are described in this disclosure with respect to the example use case of resolving ATM exceptions 110, it should be understood that the various systems and methods described in this disclosure may be employed for managing and automating actions associated with other events. For instance, the automatic reconciliation tool 112 may be employed to facilitate automated correspondence and response processing related to any issue of interest. Similarly, the prioritization tool 114 may be employed to generate an actionable queue of any items requiring user attention or review. The correspondence tool 116 may facilitate the generation or correspondence related to any issue and is not limited to the example of ATM exceptions 110 described in this disclosure.

Example Device

Figure 8:
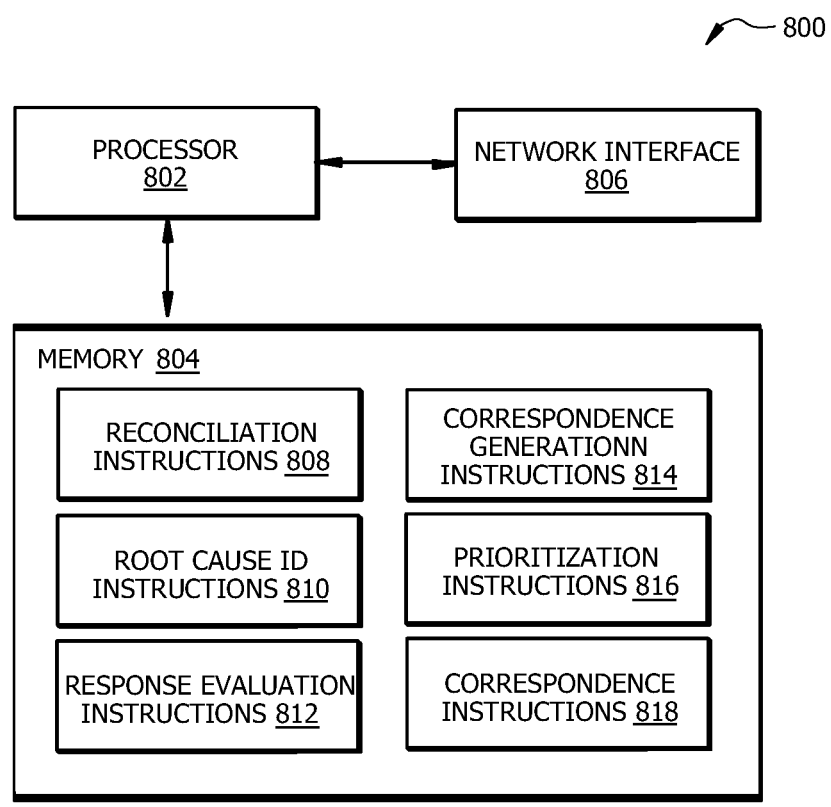
FIG. 8 is a diagram of an example device configured to implement the system of FIG. 1.

FIG. 8 is an embodiment of a device 800 configured to implement the system 100. The device 800 includes a processor 802, a memory 804, and a network interface 806. The device 800 may be configured as shown or in any other suitable configuration. The device 800 may be and/or may be used to implement the ATMs 102, the exception management system 104, automatic reconciliation tool 112, root cause determination module 204, correspondence generation module 212, correspondence evaluation module 230, prioritization tool 114, correspondence tool 116, database(s) 118, and any communication systems operated by the service provider(s) 124 and/or financial center(s) 126 of FIG. 1.

The processor 802 comprises one or more processors operably coupled to the memory 804. The processor 802 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 802 may be a programmable logic device, a microcontroller, a microprocessor, or any suitable combination of the preceding. The processor 802 is communicatively coupled to and in signal communication with the memory 804 and the network interface 806. The one or more processors are configured to process data and may be implemented in hardware or software. For example, the processor 802 may be 8-bit, 16-bit, 32-bit, 64-bit or of any other suitable architecture. The processor 802 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., instructions 808, 810, 812, 814, 816, 818) to implement the function disclosed herein, such as some or all of those described with respect to the methods 300, 500, and 700 of FIGS. 3, 5, and 7, respectively. In an embodiment, the function described herein is implemented using logic units, FPGAs, ASICs, DSPs, or any other suitable hardware or electronic circuitry.

The memory 804 is operable to store reconciliation instructions 808, root cause identification instructions 810, correspondence generation instructions 812, response evaluation instructions 814, prioritization instructions 816, and correspondence instructions 818 along with any other information used to execute the function described herein. The reconciliation instructions 808 generally include any data, instructions, logic, rules, or code operable to execute the function of the automatic reconciliation tool 112 described above with respect to FIGS. 1, 2A-C, and 3. The root cause identification instructions 810 generally include any data, instructions, logic, rules, or code operable to execute the function of the root cause identification module 204 described above with respect to FIG. 2. The correspondence generation instructions 812 generally include any data, instructions, logic, rules, or code operable to execute the function of the correspondence generation module 212 described above with respect to FIG. 2. The response evaluation instructions 814 generally include any data, instructions, logic, rules, or code operable to execute the function of the response evaluation module 230 described above with respect to FIG. 2. The prioritization instructions 816 generally include any data, instructions, logic, rules, or code operable to execute the function of the prioritization tool 114 described above with respect to FIGS. 1, 4, and 5. The correspondence instructions 818 generally include any data, instructions, logic, rules, or code operable to execute the function of the correspondence tool 818 described above with respect to FIGS. 1, 6, and 7. The memory 804 comprises one or more disks, tape drives, or solid-state drives, and may be used as an over-flow data storage device, to store programs when such programs are selected for execution, and to store instructions and data that are read during program execution. The memory 804 may be volatile or non-volatile and may comprise read-only memory (ROM), random-access memory (RAM), ternary content-addressable memory (TCAM), dynamic random-access memory (DRAM), and static random-access memory (SRAM).

The network interface 806 is configured to enable wired and/or wireless communications. The network interface 806 is configured to communicate data between the device 800 and other network devices, systems, or domain(s). For example, the network interface 806 may comprise a WIFI interface, a local area network (LAN) interface, a wide area network (WAN) interface, a modem, a switch, or a router. The processor 802 is configured to send and receive data using the network interface 806. The network interface 806 may be configured to use any suitable type of communication protocol as would be appreciated by one of ordinary skill in the art.

While several embodiments have been provided in this disclosure, it should be understood that the disclosed systems and methods might be embodied in many other specific forms without departing from the spirit or scope of this disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
  a plurality of automated teller machines (ATMs), each ATM associated with a service provider tasked with servicing a respective ATM; and
  a prioritization tool comprising:
    a memory configured to store prioritization thresholds, the prioritization thresholds comprising one or both of threshold values and threshold ranges associated with an age and an amount of ATM exceptions, wherein each ATM exception comprises a discrepancy between transaction information from the respective ATM of the plurality of ATMs and service information from the service provider tasked with servicing the respective ATM; and
    a processor coupled to the memory and configured to:
      receive ATM exceptions associated with operation of at least a portion of the plurality of ATMs;
      for each ATM exception of the plurality of ATM exceptions:
        determine, based on a comparison of an age property of the respective ATM exception to an age threshold of the prioritization thresholds, an age score for the respective ATM exception, wherein the age property comprises an amount of time that has elapsed since an event associated with the respective ATM exception;
        determine, based on a comparison of an amount property of the respective ATM exception to an amount threshold of the prioritization thresholds, an amount score for the respective ATM exception, wherein the amount property comprises an amount of money associated with the respective ATM exception;
        determine, based on the age score and the amount score, a prioritization score for the respective ATM exception, wherein the prioritization score corresponds to a measure of an order in which action should be taken to resolve the respective ATM exception;
      generate an exception queue comprising each of the received ATM exceptions ordered according to the prioritization score determined for each ATM exception;
      wherein a first age property of a first ATM exception of the received ATM exceptions is greater than a second age property of a second ATM exception of the received ATM exceptions;
      wherein a first amount property of the first ATM exception is less than a second amount property of the second ATM exception; and
      wherein a first prioritization score of the first ATM exception is less than a second prioritization score of the second ATM exception; and
      resolve the second ATM exception before resolving the first ATM exception, wherein resolving the second ATM exception comprises:
        automatically generating a first correspondence comprising a description of the second ATM exception, instructions for one or more actions to take in response to receiving the first correspondence, and a link configured to provide access to a webform comprising fields for providing response parameters;
        transmitting the first correspondence to improve resolution of the second ATM exception;
        in response to transmitting the first correspondence, receiving the response parameters via the webform; and
        in response to determining that the response parameters satisfy reconciliation criteria, determining that the second ATM exception is resolved.

2. The system of claim 1, the processor further configured to:
   determine, based on a comparison of the age property of the respective ATM exception to an age threshold range of the prioritization thresholds, an age range score for the respective ATM exception, the age range score corresponding to a value determined based on a value of the age property relative to a range of ages defined by the age range threshold; and
   determine, based on the age score, the amount score, and the age range score, the prioritization score for the respective ATM exception.

3. The system of claim 2, the processor further configured to:
   determine, based on a comparison of the amount property of the respective ATM exception to an amount threshold range of the prioritization thresholds, an amount range score for the respective ATM exception, the amount range score corresponding to a value determined based on the amount property relative to a range of amounts defined by the age range threshold; and
   determine, based on the age score, the amount score, the age range score, and the amount range score, the prioritization score for the respective ATM exception.

4. The system of claim 3, the processor further configured to:
   determine, based on a comparison of a type of the respective ATM exception to a type threshold of the prioritization thresholds, a type score for the respective ATM exception, the type score corresponding to a value determined based on the type of the respective ATM exception compared to predetermined exception types included in the type thresholds; and
   determine, based on the age score, the amount score, the age range score, the amount range score, and the type score, the prioritization score for the respective ATM exception.

5. The system of claim 4, wherein the type of the respective ATM exception comprises one or more of: the respective ATM exception being associated with a credit transaction, the respective ATM exception being associated with a debit transaction, and an identity of a first service provider tasked with servicing the ATM associated with the respective ATM exception.

6. The system of claim 1, the processor further configured to update the queue at a predefined time interval.

7. The system of claim 1, the processor further configured to detect the ATM exceptions by:
   for each ATM of the plurality of ATMs:
      comparing ATM data to service data, wherein the ATM data comprises information about transactions performed using the respective ATM and the service data comprises information about cash added to or removed from the respective ATM by the service provider tasked with servicing the respective ATM; and
      determining, based on the comparison of the ATM data to the service data, that there is a discrepancy between the ATM data to the service data; and
   detecting the ATM exceptions for the determined discrepancies.

8. A method comprising:
   storing prioritization thresholds associated with a plurality of automated teller machines (ATMs), each ATM associated with a service provider tasked with servicing ATM, the prioritization thresholds comprising one or both of threshold values and threshold ranges associated with an age and an amount of ATM exceptions, wherein each ATM exception comprises a discrepancy between transaction information from the respective ATM of the plurality of ATMs and service information from the service provider tasked with servicing the respective ATM; and
   receiving ATM exceptions associated with operation of at least a portion of the plurality of ATMs;
   for each ATM exception of the plurality of ATM exceptions:
      determining, based on a comparison of an age property of the respective ATM exception to an age threshold of the prioritization thresholds, an age score for the respective ATM exception, wherein the age property comprises an amount of time that has elapsed since an event associated with the respective ATM exception;
      determining, based on a comparison of an amount property of the respective ATM exception to an amount threshold of the prioritization thresholds, an amount score for the respective ATM exception, wherein the amount property comprises an amount of money associated with the respective ATM exception;
      determining, based on the age score and the amount score, a prioritization score for the respective ATM exception, wherein the prioritization score corresponds to a measure of an order in which action should be taken to resolve the respective ATM exception;
   generating an exception queue comprising each of the received ATM exceptions ordered according to the prioritization score determined for each ATM exception;
      wherein a first age property of a first ATM exception of the received ATM exceptions is treater than a second age property of a second ATM exception of the received ATM exceptions;
      wherein a first amount property of the first ATM exception is less than a second amount property of the second ATM exception; and
      wherein a first prioritization score of the first ATM exception is less than a second prioritization score of the second ATM exception; and
   resolve the second ATM exception before resolving the first ATM exception, wherein resolving the second ATM exception comprises:
      automatically generating a first correspondence comprising a description of the second ATM exception, instructions for one or more actions to take in response to receiving the first correspondence, and a link configured to provide access to a webform comprising fields for providing response parameters;
      transmitting the first correspondence to improve resolution of the second ATM exception;
      in response to transmitting the first correspondence, receiving the response parameters via the webform; and
      in response to determining that the response parameters satisfy reconciliation criteria, determining that the second ATM exception is resolved.

9. The method of claim 8, further comprising:
   determining, based on a comparison of the age property of the respective ATM exception to an age threshold range of the prioritization thresholds, an age range score for the respective ATM exception, the age range score corresponding to a value determined based on a value of the age property relative to a range of ages defined by the age range threshold; and determining, based on the age score, the amount score, and the age range score, the prioritization score for the respective ATM exception.

10. The method of claim 9, further comprising:

determining, based on a comparison of the amount property of the respective ATM exception to an amount threshold range of the prioritization thresholds, an amount range score for the respective ATM exception, the amount range score corresponding to a value determined based on the amount property relative to a range of amounts defined by the age range threshold; and determining, based on the age score, the amount score, the age range score, and the amount range score, the prioritization score for the respective ATM exception.

11. The method of claim 10, further comprising:

determining, based on a comparison of a type of the respective ATM exception to a type threshold of the prioritization thresholds, a type score for the ATM exception, the type score corresponding to a value determined based on the type of the respective ATM exception compared to predetermined exception types included in the type thresholds; and determining, based on the age score, the amount score, the age range score, the amount range score, and the type score, the prioritization score for the respective ATM exception.

12. The method of claim 11, wherein the type of the respective ATM exception comprises one or more of: the respective ATM exception being associated with a credit transaction, the respective ATM exception being associated with a debit transaction, and an identity of a first service provider tasked with servicing the ATM associated with the respective ATM exception.

13. The method of claim 8, further comprising updating the queue at a predefined time interval.

14. The method of claim 8, further comprising detecting the ATM exceptions by:

for each ATM of the plurality of ATMs:
  comparing ATM data to service data, wherein the ATM data comprises information about transactions performed using the respective ATM and the service data comprises information about cash added to or removed from the respective ATM by the service provider tasked with servicing the respective ATM; and
  determining, based on the comparison of the ATM data to the service data, that there is a discrepancy between the ATM data to the service data; and
detecting the ATM exceptions for the determined discrepancies.

15. A device comprising:

a memory configured to store prioritization thresholds associated with a plurality of automated teller machines (ATMs), each ATM associated with a service provider tasked with servicing a respective ATM, the prioritization thresholds comprising one or both of threshold values and threshold ranges associated with an age and an amount of ATM exceptions, wherein each ATM exception comprises a discrepancy between transaction information from the respective ATM of the plurality of ATMs and service information from the service provider tasked with servicing the respective ATM; and a processor coupled to the memory and configured to:
receive ATM exceptions associated with operation of at least a portion of the plurality of ATMs;

for each ATM exception of the plurality of ATM exceptions:
  determine, based on a comparison of an age property of the respective ATM exception to an age threshold of the prioritization thresholds, an age score for the respective ATM exception, wherein the age property comprises an amount of time that has elapsed since an event associated with the respective ATM exception;
  determine, based on a comparison of an amount property of the respective ATM exception to an amount threshold of the prioritization thresholds, an amount score for the respective ATM exception, wherein the amount property comprises an amount of money associated with the respective ATM exception;
  determine, based on the age score and the amount score, a prioritization score for the respective ATM exception, wherein the prioritization score corresponds to a measure of an order in which action should be taken to resolve the respective ATM exception;
generate an exception queue comprising each of the received ATM exceptions ordered according to the prioritization score determined for each ATM exception;
  wherein a first age property of a first ATM exception of the received ATM exceptions is treater than a second age property of a second ATM exception of the received ATM exceptions;
  wherein a first amount property of the first ATM exception is less than a second amount property of the second ATM exception; and
  wherein a first prioritization score of the first ATM exception is less than a second prioritization score of the second ATM exception; and
resolve the second ATM exception before resolving the first ATM exception, wherein resolving the second ATM exception comprises:
  automatically generating a first correspondence comprising a description of the second ATM exception, instructions for one or more actions to take in response to receiving the first correspondence, and a link configured to provide access to a webform comprising fields for providing response parameters;
  transmitting the first correspondence to improve resolution of the second ATM exception;
  in response to transmitting the first correspondence, receiving the response parameters via the webform; and
  in response to determining that the response parameters satisfy reconciliation criteria, determining that the second ATM exception is resolved.

16. The device of claim 15, the processor further configured to:

determine, based on a comparison of the age property of the respective ATM exception to an age threshold range of the prioritization thresholds, an age range score for the respective ATM exception, the age range score corresponding to a value determined based on a value of the age property relative to a range of ages defined by the age range threshold; and determine, based on the age score, the amount score, and the age range score, the prioritization score for the respective ATM exception.

17. The device of claim 16, the processor further configured to:
- determine, based on a comparison of the amount property of the respective ATM exception to an amount threshold range of the prioritization thresholds, an amount range score for the respective ATM exception, the amount range score corresponding to a value determined based on the amount property relative to a range of amounts defined by the age range threshold; and
- determine, based on the age score, the amount score, the age range score, and the amount range score, the prioritization score for the respective ATM exception.

18. The device of claim 17, the processor further configured to:
- determine, based on a comparison of a type of the respective ATM exception to a type threshold of the prioritization thresholds, a type score for the respective ATM exception, the type score corresponding to a value determined based on the type of the respective ATM exception compared to predetermined exception types included in the type thresholds; and
- determine, based on the age score, the amount score, the age range score, the amount range score, and the type score, the prioritization score for the respective ATM exception.

19. The device of claim 18, wherein the type of the respective ATM exception comprises one or more of: the respective ATM exception being associated with a credit transaction, the respective ATM exception being associated with a debit transaction, and an identity of a first service provider tasked with servicing the ATM associated with the respective ATM exception.

20. The device of claim 15, the processor further configured to detect the ATM exceptions by:
- for each ATM of the plurality of ATMs:
  - comparing ATM data to service data, wherein the ATM data comprises information about transactions performed using the respective ATM and the service data comprises information about cash added to or removed from the respective ATM by the service provider tasked with servicing the respective ATM; and
  - determining, based on the comparison of the ATM data to the service data, that there is a discrepancy between the ATM data to the service data; and
  - detecting the ATM exceptions for the determined discrepancies.

* * * * *

UNITED STATES PATENT AND TRADEMARK OFFICE
CERTIFICATE OF CORRECTION

| | |
|---|---|
| PATENT NO. | : 11,657,348 B2 |
| APPLICATION NO. | : 16/907547 |
| DATED | : May 23, 2023 |
| INVENTOR(S) | : Verlon S. Watson, III et al. |

It is certified that error appears in the above-identified patent and that said Letters Patent is hereby corrected as shown below:

On the Title Page

Item (72), Line 1, please delete "Verion S. Watson, III..." and please insert -- Verlon S. Watson, III --, therefor.

Signed and Sealed this
Twenty-fifth Day of July, 2023

Katherine Kelly Vidal
*Director of the United States Patent and Trademark Office*